United States Patent [19]
Futatsugi et al.

[11] Patent Number: 6,072,949
[45] Date of Patent: Jun. 6, 2000

[54] METHOD AND APPARATUS OF SUPPORTING PRODUCTION OF APPLICATION PROGRAM LAYOUT AND A COMPUTER PROGRAM PRODUCT

[75] Inventors: Seiji Futatsugi, Kawasaki; Katsuhiko Yuura, Kodaira, both of Japan

[73] Assignee: Hitachi, Ltd., Tokyo, Japan

[21] Appl. No.: 08/823,351

[22] Filed: Mar. 24, 1997

[30] Foreign Application Priority Data

Mar. 25, 1996 [JP] Japan .................................. 8-067931

[51] Int. Cl.[7] ...................................................... G06F 15/82
[52] U.S. Cl. .......................... 395/701; 395/683; 395/677; 395/500
[58] Field of Search ..................................... 395/500, 701, 395/677, 683, 680, 685, 705, 286, 183.14

[56] References Cited

U.S. PATENT DOCUMENTS 5,421,012  5/1995  Khoyi et al. ............................. 395/677

OTHER PUBLICATIONS

IBM Technical Disclosure Bulletin, "Reusable Software Development Toolset", vol. 33, No. 2 pp. 299–300 Jul. 1990.

*Primary Examiner*—James P. Trammell
*Assistant Examiner*—Demetra R. Smith
*Attorney, Agent, or Firm*—Antonelli, Terry, Stout & Kraus, LLP

[57] ABSTRACT

In a method of supporting production of an application program layout, when combining parts with each other, it is possible to sequentially execute the parts for evaluation thereof. There are disposed a program parts control table, a program layout control table, and component data including a program part entry for storing therein a part record of the program parts control table, and a message delivery program for delivering an external message call to each execution object corresponding to the program part entry. According to an indication input including specification of a program part, a part record is set to the program part entry of the component data, and the application program is executed by exchanging a message between the component data items. The message delivered to each component data is processed by the message delivery program.

21 Claims, 26 Drawing Sheets

| IDENTIFIER (601) | PROGRAM NAME (602) | REALIZATION NAME LIST (603) |
|---|---|---|
| 1 | SALES MANAGER SERVER | A1 |
| 2 | SALES MANAGER CLIENT | A100 |

| IDENTIFIER (701) | COMPONENT DATA LIST (702) | REFERENCE (703) | NON-COMPONENT LIST (704) |
|---|---|---|---|
| A1 | 1,2,3,4,5,6 | - | Main 0 |
| A100 | 7,8,9 | -- | Main 100 |

| IDENTIFIER | COMPONENT NAME |
|---|---|
| 1 | Stock Mgr Agent |
| 2 | Order Mgr Agent |
| 3 | Aalysis Mgr Agent |
| 4 | Stock DB Agent |
| 5 | Order DB Agent |
| 6 | Aalysis DB Agent |
| 7 | Stock Clt Agent |
| 8 | Order Clt Agent |
| 9 | Aalysis Clt Agent |

| IDENTIFIER | PROGRAM PARTS CLASSIFICATION | PROGRAM NAME | CONNECTION RESULTS LIST |
|---|---|---|---|
| 1 | STOCK MANAGER | Stock Mgr | 95,96,520,522 |
| 2 | STOCK MANAGER | Stock Mgr_M | 95,97,98,522 |
| 3 | STOCK MANAGER | Stock Mgr_MM | 95,98,523 |
| ... | | | |
| 13 | ORDER MANAGER | Order Mgr | 124,125,527 |
| 14 | ORDER MANAGER | Order Mgr_M | 125,530 |
| ... | | | |
| 28 | SALES DATA ANALYSIS MANAGER | Analysis Mgr | 127,535 |
| ... | | | |
| 95 | STOCK MANAGER MASTER | Stock DB | 1,2,3 |
| 124 | ORDER MANAGER MASTER | Order DB | 13 |
| 127 | SALES DATA ANALYSIS MASTER | Analysis DB | 28 |
| 520 | STOCK MANAGER SCREEN | Stock Clt | 1 |
| 527 | ORDER SCREEN | Order Clt | 13,15 |
| 535 | SALES DATA ANALYSIS SCREEN | Analysis Clt | 28 |
| ... | | | |
| MAIN 0 | SALES MANAGER SERVER CONTROL | Server Main | 1,13,28,95,124,127 |
| ... | | | |
| MAIN 100 | SALES MANAGER CLIENT CONTROL | Client Main | 520,527,535 |

Columns: 1001, 1002, 1003, 1004

| IDENTIFIER | PROGRAM PART IDENTIFIER | NESSAGE NAME | Arg Count | Argment1 | Argment2 | Argment3 |
|---|---|---|---|---|---|---|
| 1 | 1 | Add | 2 | Item | int | |
| 2 | 1 | Remove | 2 | Item | int | |
| 3 | 1 | Refer | 2 | Item | int & | |
| ... | ... | | | | | |
| 9 | 2 | Remove | 2 | Item | int | |
| 10 | 2 | Refer | 2 | Item | int & | |
| ... | ... | | | | | |

| IDENTIFIER (601) | PROGRAM NAME (602) | REALIZATION NAME LIST (603) |
|---|---|---|
| 1 | SALES MANAGER SERVER | A1,A2,A3,A4,A5,A6 |
| 2 | SALES MANAGER CLIENT | A100,A101,A102,A103,A104,A105 |

| IDENTIFIER (701) | COMPONENT DATA LIST (702) | REFERENCE (703) | NON-COMPONENT LIST (704) |
|---|---|---|---|
| A1 | 1,2,3,4,5,6 | — | Main0 |
| A100 | 7,8,9 | — | Main100 |
| A2 | 1,2,3,4,5,6 | A1 | Main0 |
| A101 | 7,8,9 | A100 | Main100 |
| A3 | 1,2,3,4,5,6 | A2 | Main0 |
| A102 | 7,8,9 | A101 | Main100 |
| A4 | 1,2,3,4,5,6 | A3 | Main0 |
| A103 | 7,8,9 | A102 | Main100 |
| A5 | 1,2,3,4,5,6 | A1 | Main0 |
| A104 | 7,8,9,10,11,12 | A100 | Main100 |
| A6 | 1,2,3,4,5,6 | A5 | Main0 |
| A105 | 7,8,9,10,11,12 | A104 | Main100 |

METHOD AND APPARATUS OF SUPPORTING PRODUCTION OF APPLICATION PROGRAM LAYOUT AND A COMPUTER PROGRAM PRODUCT

BACKGROUND OF THE INVENTION

The present invention relates to a method and apparatus of supporting production of application program layout, and in particular, to a method and apparatus of supporting production of application program layout in which program parts beforehand generated for respective functions are utilized as constituent components of a new program and a program code product therefor.

When creating an application program, there has been increasing employed a process in which program parts subdivided into associated functions are used. In some package programs available in the market, components thereof are created as program parts which can be invoked for operation by another program.

For example, the database management program called "Access" of Microsoft described in Jon Udell, "COMPONENTWARE", BYTE, May 1994, pp. 46–56 has constitution in which centered on table parts controlling data items, program parts as such programs as statistic analysis and graph programs can be coupled with each other. These program parts can be called by external programs. Available program parts additionally includes input/output screens, work sheets for table calculation, data analyses, numeric calculations, etc.

In the job to create a new program using such arts, there are achieved a job to modify or add the function of a part and a job to describe a program which establishes a link between parts. Namely, the application program creating job includes an operation to generate and modify program parts and an operation to combine the parts with each other.

Thanks to the utilization of program parts, the programmer is not required to generate the program parts, leading to an advantage that program errors are avoided and the operation of program inspection can be dispensed with. As a result, it can be expected that increase productivity of application programs is increased.

To produce a program using program parts, it is essential to choose appropriate program parts. There have been provided a large number of program parts including those of the example of "Access". It is not easy to select therefrom optimal parts satisfying all requirements related to the function, performance, program size, and the like.

Recently, the environments supporting application program construction have been studied and developed in relation to the repository technology. That is, usage of databases can be considered as a method of supporting selection of program pats. For example, such information items as a function and a performance characteristic are added to program parts to be stored in a database. Using such a database, it will be possible to search program parts, for example, for a function of "displaying a chart of change in stock prices" and performance of "chart display speed of 0.1 second or less". According to results of the search, the programmer acquires the program parts from the database to incorporate them in an application program.

A huge number of program parts are available in the current market and hence it is possible to use such parts for an application to be generated. Simply speaking, if ten candidate program parts exist for each of ten functions constituting the application program, it will be required to investigate one hundred combinations therebetween. In this case, heretofore, investigation has been carried out for only several combinations assumed to be acceptable by the developer. However, the investigating procedure is not automatically executed and there is required a large volume of human power. In a case in which portions of the program parts are unsatisfactory, for example, it is necessary to modify program parts according to combinations therebetween, the procedure of evaluating the overall program may possibly be disturbed.

Additionally, some program parts resultant from the search through the repository are not necessarily optimal to configure the program under development. Program parts are used in various situations and hence it cannot be guaranteed that the program parts develop the same performance in any cases. Furthermore, the performance is remarkable altered by other program parts utilized.

In addition, for the program evaluation, there are employed in addition to the function, speed, and program size, the maintenability, reliability, price, interface program generation environments, etc. In consequence, the prior art is attended with a program that only in the final state in which the application program is generated through assemblage of program parts, it can be recognized that the performance is unsatisfactory.

In this connection, according to, for example, an article Guy L. Steele Jr.; "Common Lisp Object System" Digital Press, 1990, pp. 770–815, there has been developed a method in which parts are actually operated for the confirmation of appropriateness thereof. In the CLOS processing system, at a temporary interruption of a program, a function beforehand executed can be changed. Furthermore, it is possible to vary definition of an object which can be regarded as a program part. In addition, when a plurality of objects are assigned with an identical message interface, an object which receive a message can be dynamically altered (in association with the execution environments). In such a CLOS processing system, although the combinations between parts can changed during execution, replacement of parts is not automatically carried out. Namely, a target combination between parts is required to be specified by a program.

SUMMARY OF THE INVENTION

It is therefore an object of the present invention to provide a method and apparatus of supporting production of application program and a program product in which in a process of combining parts with each other, the parts can be executed and evaluation.

To achieve the object above according to the present invention, there is provided a method and apparatus of supporting production of an application program layout by combining with each other a plurality of program parts obtained by subdividing an application program from a viewpoint of function units thereof, said program controlling execution of a computer system and also a program product therefor. The method includes the steps of disposing a program parts control table including part records each including an identifier identifying each of the program parts, a function classification for classifying each of the program parts according to a function thereof, a message interface for interfacing messages of the program parts, and an execution object predetermined for an application program; disposing a program layout control table describing a layout of an application program with a layout record including an identifier of each of the program parts stored in the program parts control table; and disposing component data items each having a one-to-one correspondence with the layout records and including a program part entry for storing therein parts records of the program parts control table and a message delivery program delivering an external message call to an execution object correponding to the program parts of the program part entry. The method further including the steps of:

(A) responsive to an indication input including specifying of a program part by an identifier for the program part realizing each function of the application program;

(A-1) acquiring component data corresponding to the function;

(A-2) acquiring the part record including the identifier from the program parts control table, referring to the part record, and setting the part record to the program part entry of the component data;

(B) responsive to an indication input of execution of the application program;

(B-1) generating an execution object including all component data items corresponding to the layout record of the program layout control table;

(B-2) executing the execution object through exchange of the message between the component data items; and (B-3) sending the message delivered to each component data item to the message delivery program. Thanks to the method, while combining the parts with each other, it is possible to sequentially execute the parts for evaluation thereof.

According to the present invention, the method of supporting production of application program layout further favorably includes the steps of disposing in the component data a candidate list for storing therein a list of program parts, storing in the candidate list a program part of a program parts control table for exchange with the program part entry, and setting specified one of the program parts stored in the candidate list to the program part entry. This method consequently helps easily select program parts from the candidate list.

In accordance with the present invention, the method of supporting production of application program layout further favorably including the steps of being responsive to an indication input of program parts in step (A), the indication input specifying a joker part; executing the message delivery program in step (B-3) according to a format of the message; achieving comparison by the message delivery program, for each of the part records stored in the candidate list of the component data, between a message format attained from the part record and that of the delivered message, thereby delivering the message to an execution object acquired from the part record for which the comparison results in matching. Due to the method, the number of suitable program parts can be easily decreased.

According to the present invention, in the method of supporting production of an application program layout, a searching sequence of the part records in the candidate list of the component data can be favorably changed in the search thereof when an execution of the application program is indicated. Using the method, the priority levels of candidates can be altered.

In accordance with the present invention, the method of supporting production of an application program layout further favorably includes the steps of assigning a realization name as a name for a combination of parts of the application program, disposing in the layout record of the program layout control table a realization entry for storing therein the realization name, disposing in the component data a historical list including as an element thereof a combination of the part record and the realization name, being responsive to an indication of saving of a layout of the application program with specification of the realization name, recording the realization name in the realization name entry of the layout record in the program layout control table, and recording in the history control list of the component data the part record and the realization name stored in the program part entry. This enables the history of changes to be controlled.

According to the present invention, the method of supporting production of application program layout further favorably includes the steps of displaying a plurality of nodes presenting the realization names on a display in a format using arcs establishing connections between the nodes according to relationship of dependence related to the realization. Thanks to the method, it is possible to easily recognize the process of changes in the application program.

In accordance with the present invention , the method of supporting production of an application program layout further favorably includes the steps of disposing in the component data a program example entry for storing therein information of a particular call interface and an execution object associated therewith and referring, by the message delivery program, to the format of an external message call, thereby delivering the message to the execution object when the format matches the interface information of the program example entry. Using the method, it is possible to confirm the operation of the entire application including incomplete portions thereof.

According to the present invention, the method of supporting production of application program layout further favorable includes the steps of disposing in the part record of the program parts control table an entry for storing therein a connection results list and storing program parts in the connection results list of each of the part record when an application program is saved, the program parts included in an identical application program in the program layout control table. Accordingly, any preceding layouts highly appreciated can be referred to in this method.

BRIEF DESCRIPTION OF THE DRAWINGS

These and other objects and advantages of the present invention will become apparent by reference to the following description and accompanying drawings wherein:

FIG. 6 is a program layout control table 150 for use with the embodiment of a method of supporting production of an application program layout in accordance with the present invention;

FIG. 7 is a configuration diagram of a realization control table 151 for use with the embodiment of a method of supporting production of an application program layout in accordance with the present invention;

FIG. 8 is a configuration diagram of a component data control table 152 for use with the embodiment of a method of supporting production of an application program layout in accordance with the present invention;

FIG. 10 is a configuration diagram of a program parts control table 160 for use with the embodiment of a method of supporting production of an application program layout in accordance with the present invention;

FIG. 11 is a configuration diagram of a message control table 161 for use with the embodiment of a method of supporting production of an application program layout in accordance with the present invention;

FIG. 22 is a layout diagram of a program layout control table 150 for use in the embodiment of a method of supporting production of an application program layout in accordance with the present invention;

FIG. 23 is a layout diagram of a realization control table 151 for use in the embodiment of a method of supporting production of an application program layout in accordance with the present invention;

DESCRIPTION OF THE PREFERRED EMBODIMENTS

Referring now to FIGS. 1 to 30, description will be given of an embodiment of a method of supporting production of an application program layout in accordance with the present invention.

[1. System configuration]

Figure 1:
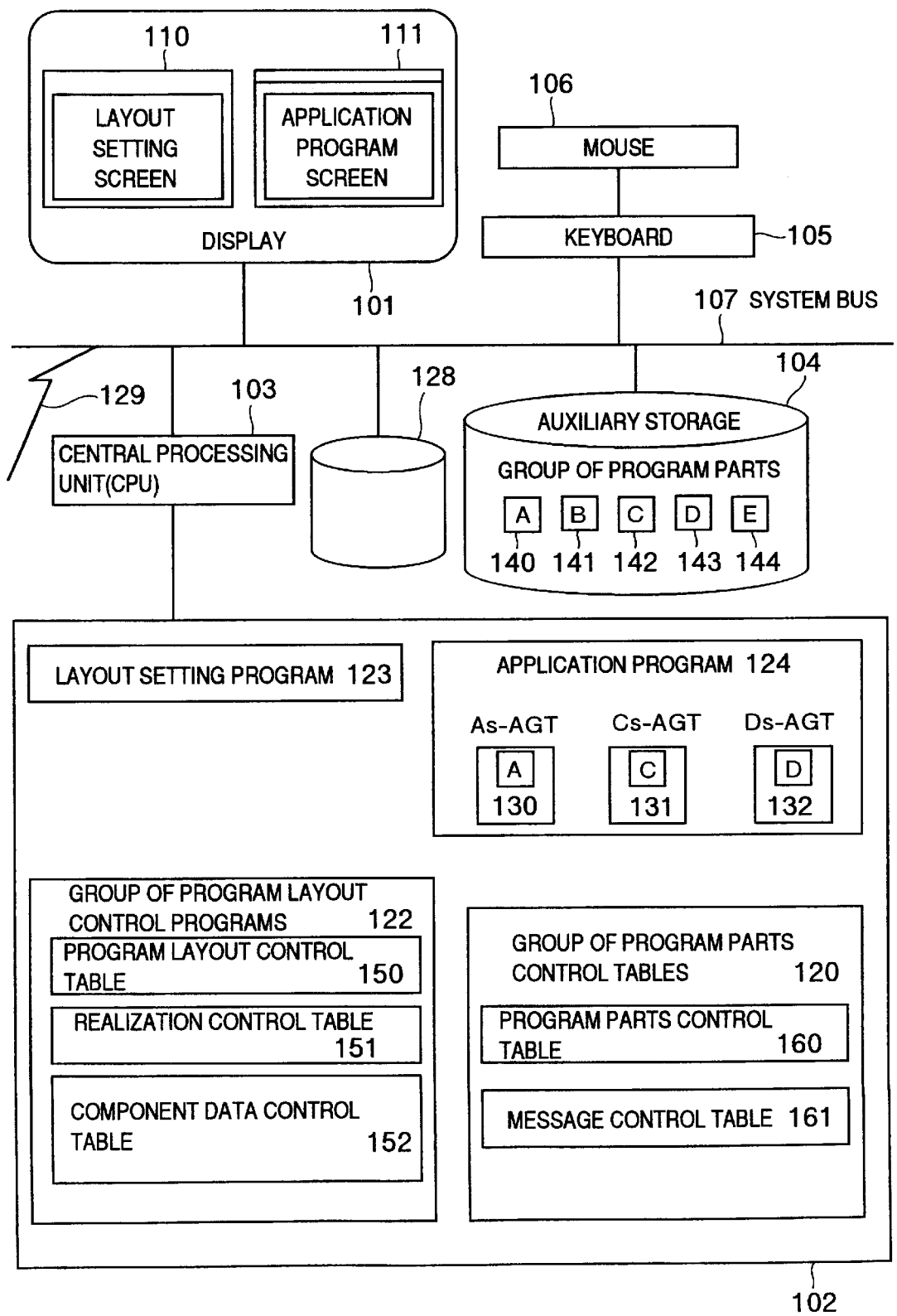
FIG. 1 is a diagram showing the system configuration including hardware and primary software components for use with an embodiment of a method of supporting production of an application program layout in accordance with the present invention.

Description will be first given of the overall system configuration by referring to FIG. 1.

FIG. 1 is a system configuration showing a hardware system and primary software elements utilized in the embodiment of a method of supporting production of an application program layout in accordance with the present invention.

In the hardware system, a display 101, a main storage 102, a central processing unit (CPU) 103, an auxiliary storage 104, and a keyboard 105 and a mouse 106 as input devices are connected to each other via a system bus 107. Programs loaded in the main storage 102 are processed by the CPU 103.

In the main storage 102, there are arranged a program for supporting production of application program layout (to be referred to as "layout setting program" herebelow) 123, a group of program layout control tables 122 and a group of program parts control tables 120 to which reference is made by the layout setting program 123.

Stored in the auxiliary storage 104 are program parts extracted from those configured as past application programs and such program parts available in the market as "Access". It is assumed in this situation that program part A 140, program part B 141, program part C 142, program part D 143, and program part E 144 are stored in the auxiliary storage 104.

The layout setting program 123 selects arbitrary program parts from the auxiliary storage 104 in which program part A 140, program part B 141, . . . , and program part E 144 are stored and then combines the selected parts with each other to produce an application program 124 by referring to the group of program layout control tables 122 and the group of program parts control tables 120 so as to store the program 124 in the main storage 102.

In the configuration of the embodiment, the application program as the production object is not only the combination between the program parts 140 to 144. Namely, to be incorporated in the program 124 are component data items 130 to 132 respectively including the program parts 140 to 144 (or these program parts are respectively obtainable with the respective component data items through pointing processes). The component data items 130 to 132 substitute respectively for functions of the application programs A 140, C 142, and D 143 respectively incorporated therein. The data items 130 to 132 are located at positions at which the associated program parts are disposed. In the technology of the prior art, the application program is constructed only with the program parts such as parts "A", "C", and "D".

According to an aspect of the configuration of the embodiment, the program parts are not directly utilized in the application program, but are incorporated in objects (units including a data layout and a program corresponding thereto) call component data items so as to construct an application program by combining such component data items. Thanks to the configuration, a change of a program part can be replaced with a change of setting in a component data item. Namely, influence of such a change onto other parts can be minimized.

A component data items is assigned to each function unit of a specified program. In this connection, since the function unit is assignment of a program part, the component data item is a unit to substitute the function of the program part.

The component data in which an application program is incorporated in a kind of agent program. A component data item 130 in which the application program A 140 is incorporated is represented as A' s-AGT, a component data item 131 in which the application program C 142 is incorporated is represented as C' s-AGT, and a component data item 132 in which the application program D 143 is incorporated is represented as D' s-AGT. Incidentally, the reason why the component data item is a kind of agent program will be described later.

The group of program layout control tables 122 is adopted to record therein functional classifications and program parts to be used for the respective functions. Additionally, in relation to the combinations of program parts, historical information of parts executed in the past and a relationship between historical information items will be also controlled. The table 122 includes three tables, namely, a body of program layout control table 150, a realization control table 151 to control realization names, and a component data control table 152 to control component data.

In addition, the group of program parts control tables 120 is associated with the repository described above. Using the table group 120, there are controlled profiles in which functions and the like of respective program parts are described, calling formats (function name, argument, return value, etc) adopted the parts are called by other programs, utilization results of the respective parts. The table group 120 includes two tables, namely, a body of program parts control table 160 and a message control table 161. In this regard, classification of table groups 122 and 120 is introduced to facilitate the control operation and hence there can be used classifying procedures other than that of the present embodiment.

Displayed on the display 101 are a layout setting screen 110 of the layout setting program 123 and application program screen 111. The user operates the screens 110 and 111 via the mouse 106 and keyboard 105 such that the operation is transferred to associated programs to activate appropriate processes.

[2. Outline of layout setting program]

Figure 2:
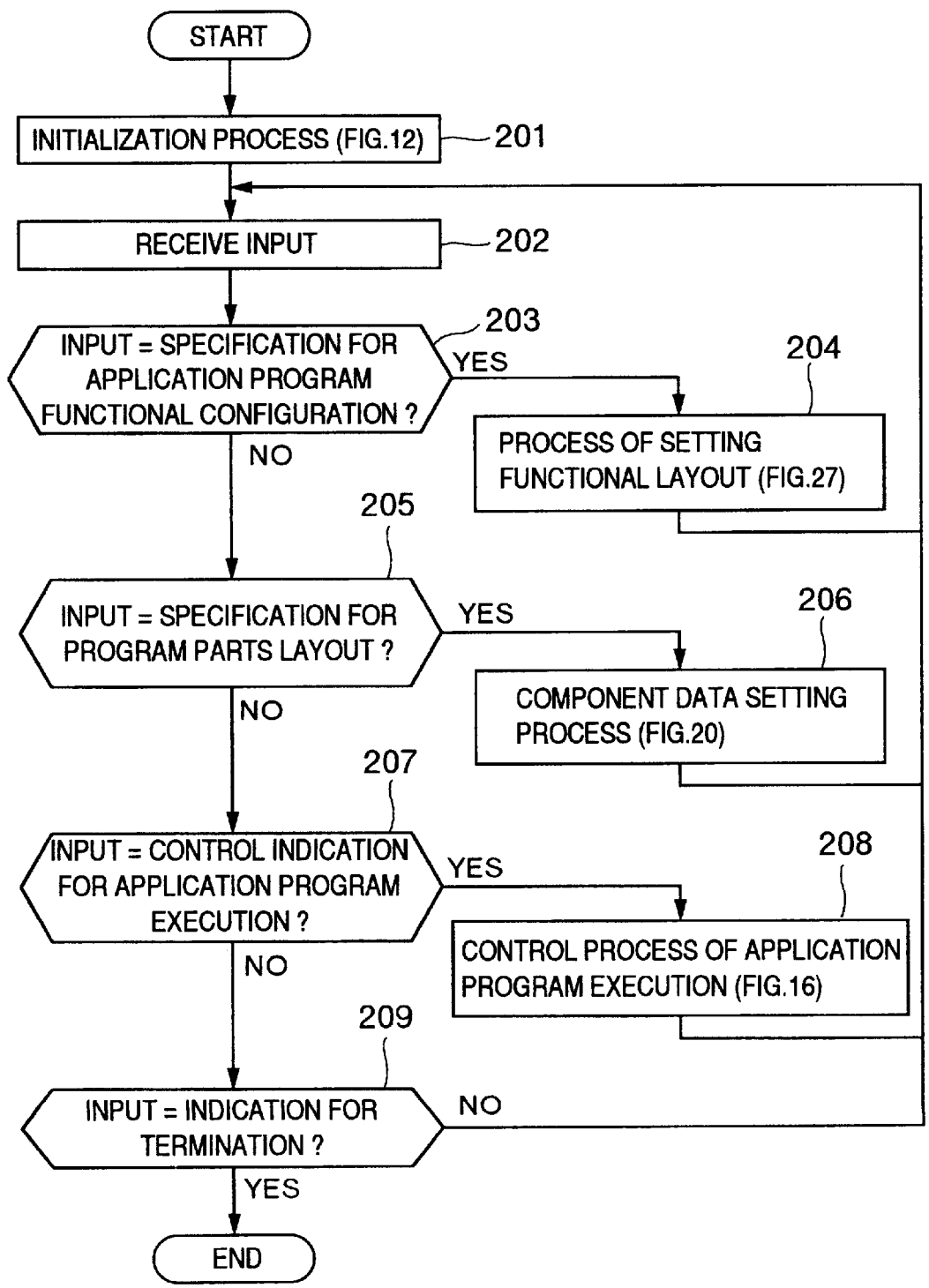
FIG. 2 is a flowchart for showing an outline of a layout setting program for use with the embodiment of a method of supporting production of an application program layout in accordance with the present invention.

Referring next to FIG. 2, description will be given of an outline of the layout setting program 123 used in the embodiment of the method of supporting production of application program in accordance with the present invention.

FIG. 2 shows in a flowchart an outline of the layout setting program 123 used in the embodiment of the method of supporting production of application program in accordance with the present invention.

When the program 123 is started, an initialization process is carried out in step 201. Details of the process will be described later by referring to FIG. 12.

When the initialization is completed, step 202 is executed to receive an input from the user to accomplish a process according to the input. Namely, there is conducted a process in event flow type.

In step 203, when the input is recognized as specification for a functional layout of an application program, step 204 is invoked to activate a process of setting a functional layout. Details of the layout setting process will be described later by referring to FIG. 27.

In step 205, when the input is assumed as specification for layout of a program part, step 206 is initiated to start a process of setting component data according to the specified program part. This process will be described in detail later by referring to FIG. 20.

When the input is regarded as indication to control execution of the application program in step 207, an execution control process of the application program is started in step 208. Details of this process will be described later by referring to FIG. 16.

In step 209, when the input is other than an end indication, control is returned to step 202. If this is the case, the program is terminated.

In this connection, the layout setting program 123 (FIG. 1) achieves processing by interactively communicating with component data items 130 to 132 incorporated in the application program 124. This is achieved using its characteristic analogous to the society. Namely, a spy is provided in the object of development such that the spy reports the state and situation of the object. In this meaning, the component data items 130 to 132 belong to a type of agent programs. Each thereof includes a message delivery program to conduct a role of agent. Details of the message delivery program 2000 shown in FIG. 9 will be described in detail later by referring to FIGS. 17 and 18.

[3. Application program as development object used in configuration of this embodiment]

Assume now a situation in which an application is actually created and/or changed. In relation to the case, description will be given of communication between the layout setting program (FIG. 2; details in FIGS. 16, 20, and 27) and the message delivery program (FIG. 9; details in FIGS. 17 and 8) for the user support. Resultantly, by referring to FIGS. 3 to 5, description will be given of an advantage of the embodiment of the method of supporting production of application program in accordance with the present invention.

Figure 4:
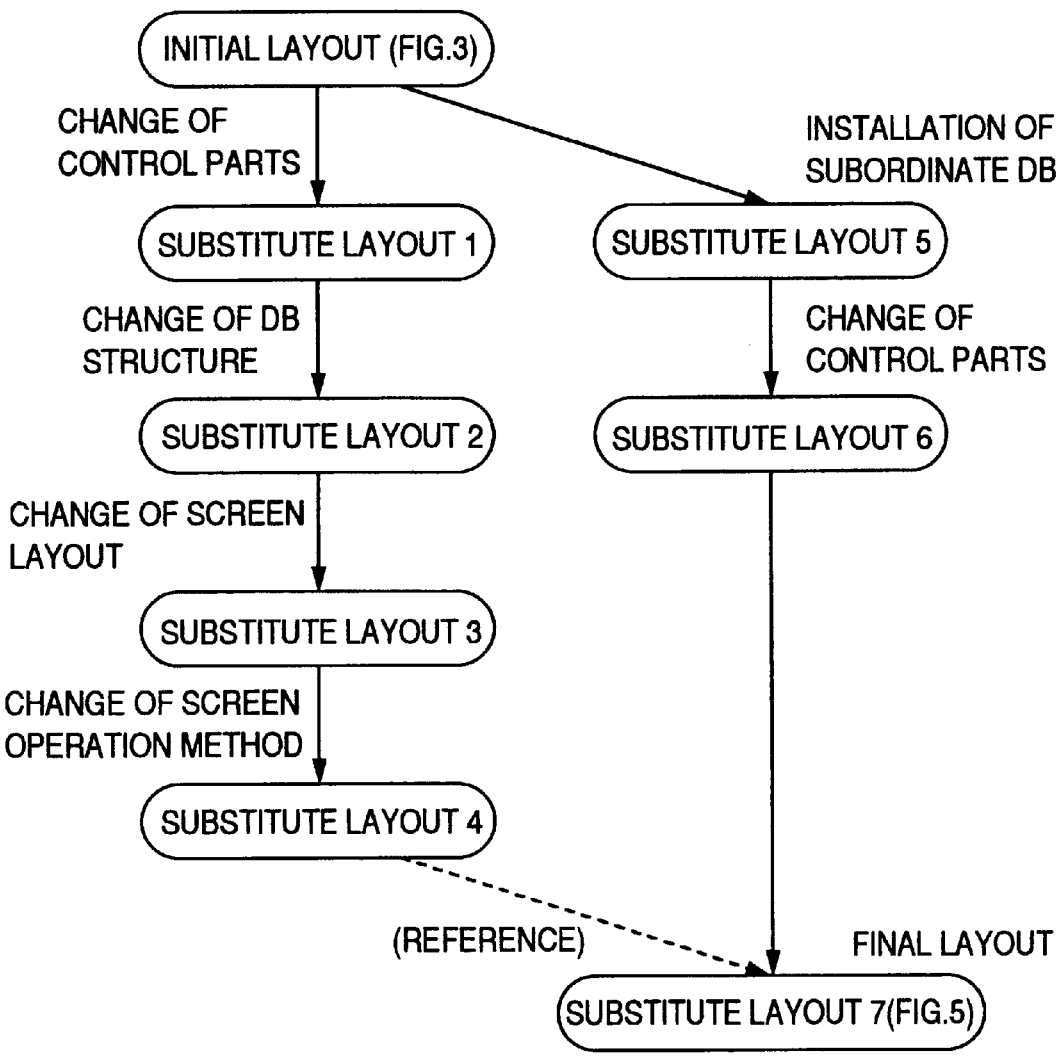
FIG. 4 is an explanatory diagram showing a change process in the embodiment of a method of supporting production of an application program layout in accordance with the present invention.
Figure 5A:
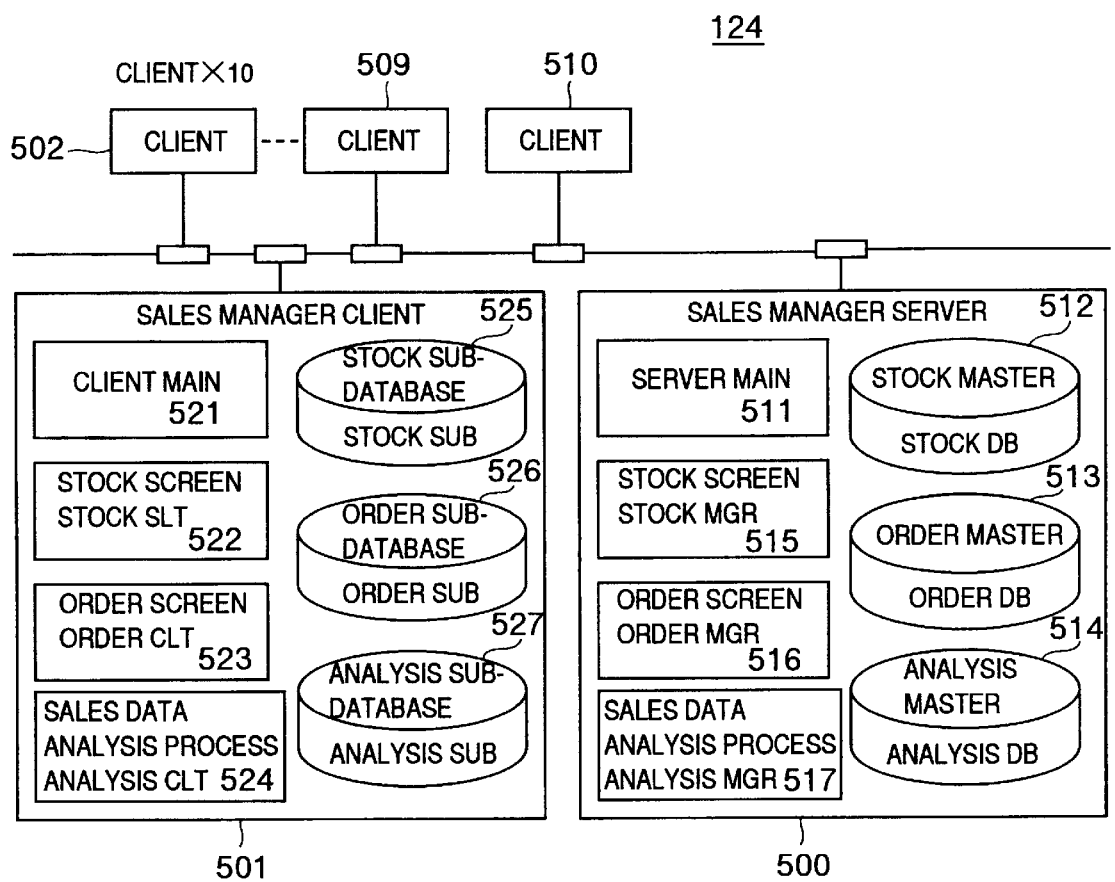
FIGS. 5A and 5B are layout diagrams of an application program finally generated according to the embodiment of a method of supporting production of an application program layout in accordance with the present invention.
Figure 5B:
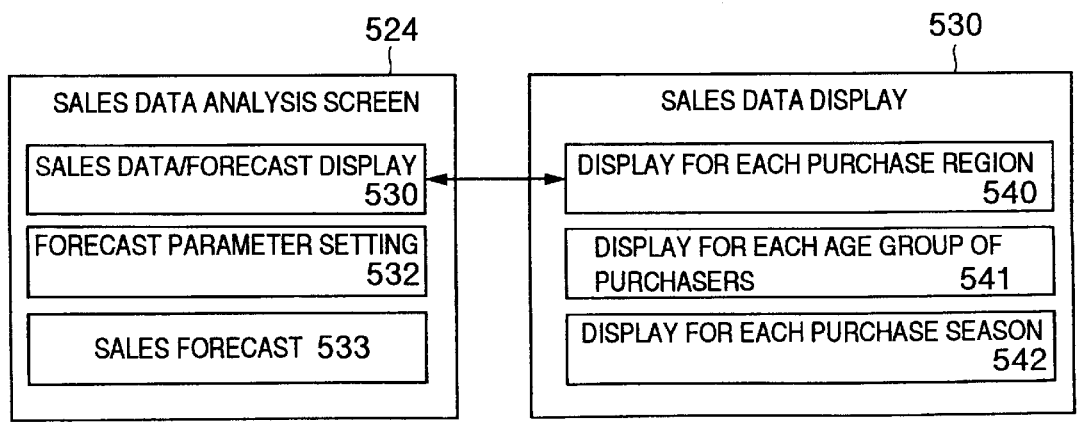

In the following description of a process example using an application program (FIGS. 3A and 3B) beforehand generated, program parts thereof are altered (FIG. 4) to thereby create a new program (FIGS. 5A and 5B). Description will be given first of a sequence of altering steps and then of operations of the layout setting process in association therewith.

Figure 3A:
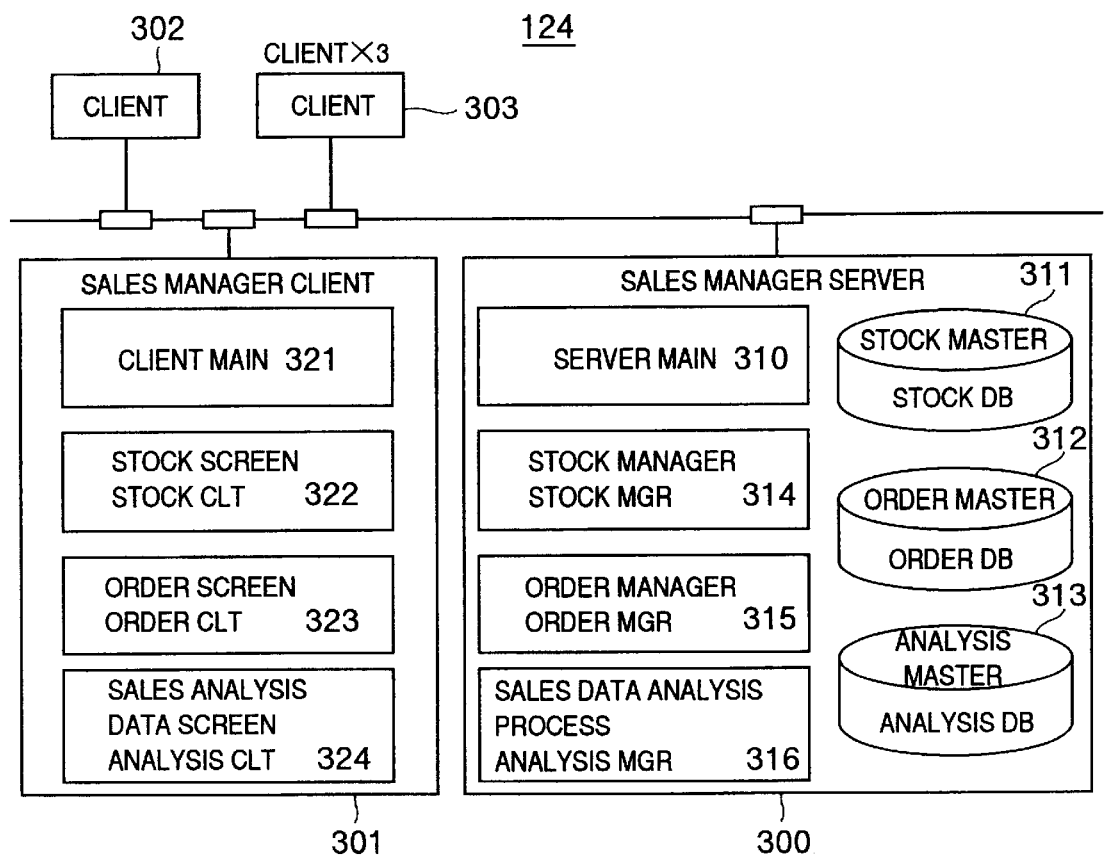
FIGS. 3A and 3B are layout diagrams of an application program beforehand generated for explaining the embodiment of a method of supporting production of an application program layout in accordance with the present invention.
Figure 3B:
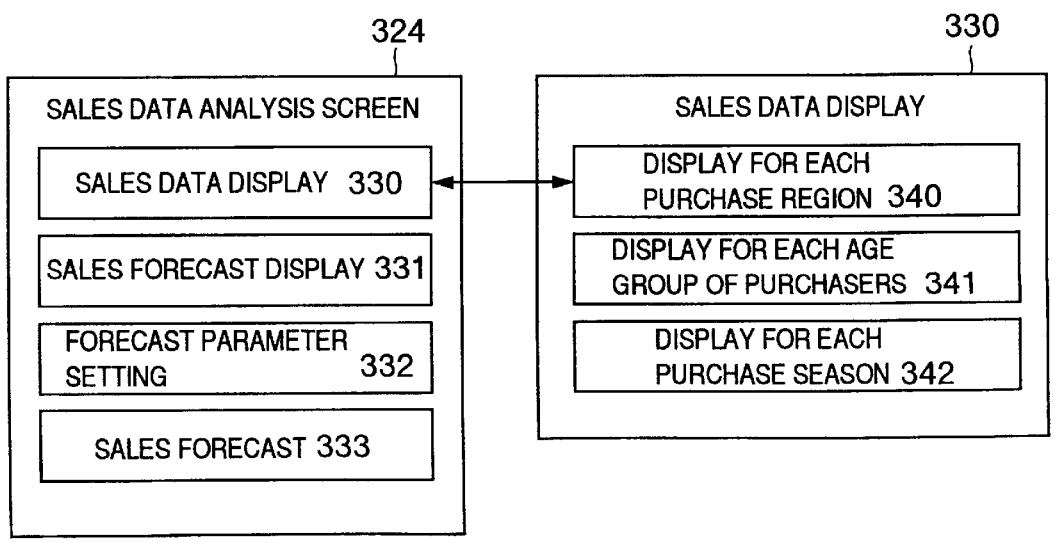

FIGS. 3A and 3B are configuration diagrams of the application program generated in the past for explaining the embodiment of supporting production of application program according to the present invention. FIG. 4 is an explanatory diagram showing a process of changes in the embodiment. FIGS. 5A and 5B show in a layout diagram an application finally produced in the method of the present invention.

FIG. 3A shows the overall program structure and FIG. 3B shows in detail the program layout of a portion of a program on a client side.

The application program of FIGS. 3A and 3B has an object, for example, to achieve the stock management, order management, or sales data analysis.

The system includes, as shown in FIG. 3A, a sales manager server program 300 stored in a sales manager server computer achieving a data base process and sales manager client programs 301 to 303 respectively stored in three sales manager client computers. This system has been actually operated. The system achieves processes through communications between the server program 300 and the client programs 301 to 303.

The primary process of the server program 300 conducts a server main (Server Main) program 310 to control operation of each program part subdivided in a process unit. The program parts on the side of server program 300 includes a stock master database (Stock DB) 311 as the stock manager database, an order master database (Order DB) 312 as the order data database, an analysis master database (Analysis DB) 313 as the sales database of data analysis data, and such program parts for interfacing client calls of the respective databases as a stock manager (Stock Mgr) 314, an order manager (Order Mgr) 315, and a sales data analysis manager (Analysis Mgr) 316.

The main process of the client program 301 is carried out by a client main (Client main) program 323 supervising operation of each program in the process unit. The program parts of the client program 301 includes a stock screen (Stock Client (Clt)) 322, an order screen (Order Clt) 323, and a sales data analysis screen (Analysis Clt) 324.

Additionally, as can be seen from FIG. 3B, the sales data analysis screen 324 includes sales data display 330, sales forecast display 331, forecast parameter setting 332, and sales forecast 333. The sales data display 330 further includes display for each purchase region 340, display for each age group of purchasers 341, and display for each purchase season 342.

Using the constitution shown in FIGS. 3A and 3B as a starting point, there is produced an application program matching a new object. In a new system configuration, there are provided ten clients and the screen design (screen layout and operation procedure) is changed in the pertinent client. In this connection, the alteration in the number of clients causes a problem of performance in the accessing of the databases. It is important in this case that the contents and layout of program parts are required to be changed on both of the server and client sides.

Referring now to FIG. 4, an example of the change process will be described. First, in the initial layout shown in FIGS. 3A and 3B, manager parts are changed to create substitute layout 1, and the databases (DB) are modified to produce substitute layout 2. Thereafter, the screen layout is altered to obtain substitute layout 3, and the screen operation procedure is varies to produce substitute layout 4. While achieving a first modification in the sequence of substitute layouts 1 to 4, the results are investigated and it is found that the obtained layout is unsatisfactory in functions.

To overcome the difficult, a subordinate database (DB) is additionally installed in substitute layout 5 and then manager parts are altered to attain substitute layout 6. Making reference to substitute layout 4 (including changes in the database structure, screen layouts, screen operations) as the final layout in the first modification, required parts are acquired therefrom to generate substitute layout as the final layout. In this diagram, since a local database is missing in the first modification, there occurs a change in the design such that the layout is altered in the second modification for evaluation of the layout.

FIGS. 5A and 5B show substitute layout 7 attained as the final layout as a result of evaluation in FIG. 4. FIG. 5A presents the overall system and program configuration, whereas FIG. 5B shows a detailed program layout of a portion of the program on the client side.

As shown in FIG. 5A, the system includes a sales manager server program 500 stored in a sales manager server computer to conduct a data base process and sales manager client programs 501 to 510 respectively stored in three sales manager client computers. The system achieves processes through communications between the server program 500 and the client programs 501 to 510.

The program parts in the server program 500 includes a server main (Server Main) program 510, a stock master 511 as the stock manager database, an order master 512 as the order data database, an analysis master 513 as the sales database of data analysis data, and such processes for interfacing client calls of the respective databases as a stock manager 514, an order manager 515, and a sales data analysis process 516. Although these parts basically correspond to the Server Main program 310, stock master 311, order master 312, analysis master 313, stock manager 314, order manager 315, sales data analysis process 316, there have been achieved changes (replacements) of the respective program parts.

Additionally, the program parts of the client program 501 additionally includes a stock sub-database (Stock Sub) 525, an order sub-database (Order Sub) 526, and an analysis sub-database (Analysis Sub) 527. Moreover, program parts are changed in the client main (Client Main) program 523, stock screen 522, order screen 523, and sales data analysis screen 524.

In addition, as can be seen from FIG. 5B, the analysis screen 524 is modified to a layout including sales data/forecast display 530, forecast parameter setting 532, and sales forecast 533 for the display and forecast of sales data. The sales data/forecast display 530 includes modified results, namely, display for each purchase region 540, display for each age group of purchasers 541, and display for each purchase season 542.

Description will be next given of the support operation of the layout setting program 123 (FIG. 1) for the changes in the sequence from the initial layout of FIG. 3 to substitute layout 7 shown in FIGS. 5A and 5B.

[4. Group of control tables in initial state]

Next, referring to FIGS. 6 to 11, description will now be given of the initial states of the contents of the body of program layout control table 150, realization control table 151, and component data control table 152 of the group of program layout control tables 122, the configuration of component data 130, and the final states of the contents of the body of program part control table 160 and message control table 161 of the group of program parts control tables 120.

Figure 9:
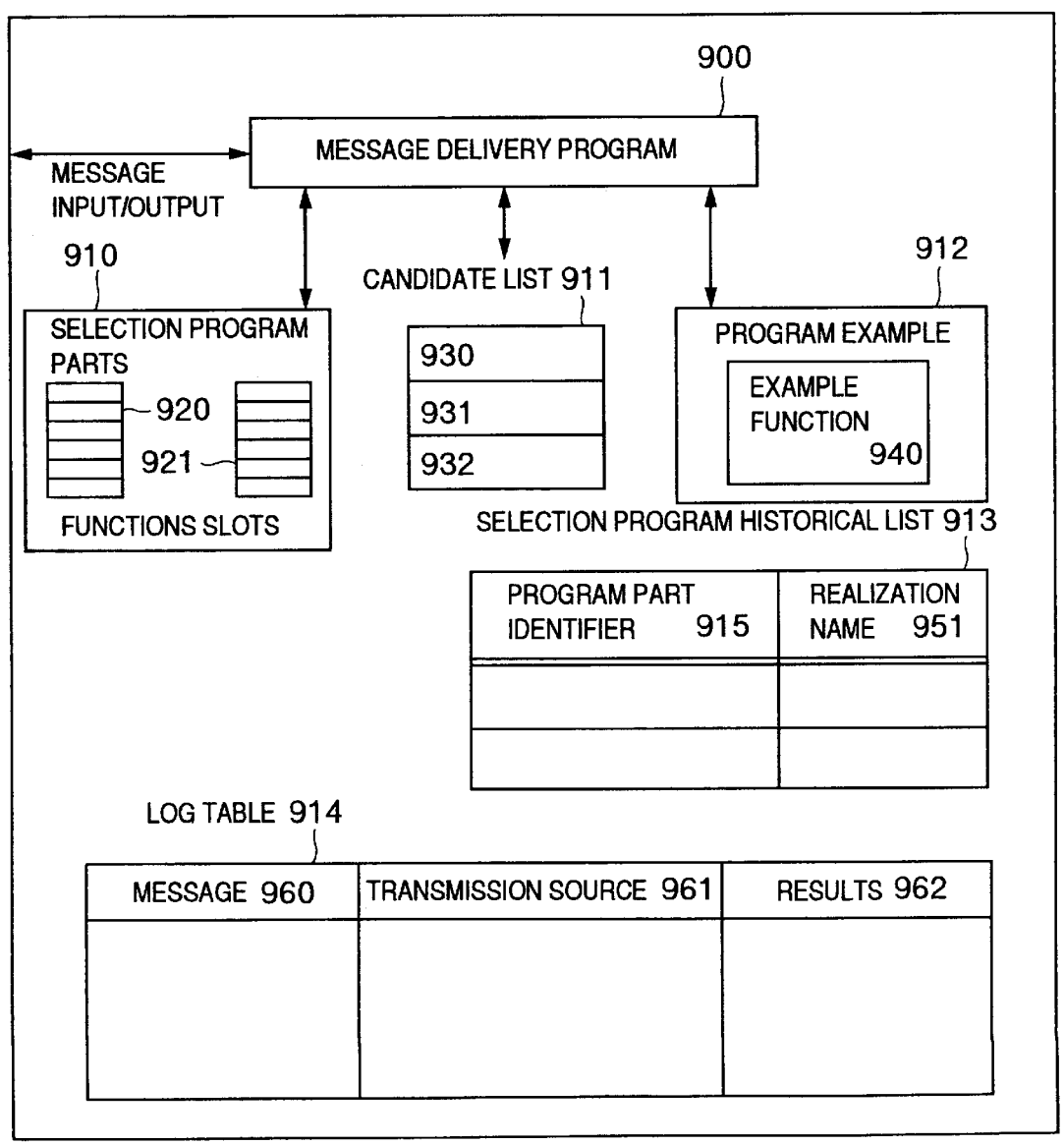
FIG. 9 is a configuration diagram of a component table 130 for use with the embodiment of a method of supporting production of an application program layout in accordance with the present invention.

FIG. 6 shows in a configuration diagram a program layout control table 150 employed in the embodiment of the method of supporting the production of application program layout. FIG. 7 is a configuration diagram of a realization control table 151 adopted in the layout support method. FIG. 8 is a constitution diagram of a component control table 152 utilized in the embodiment of layout support method. FIG. 9 is a layout diagram of a component table 130 used in the layout support method. FIG. 10 is a construction diagram of a program parts control table 160 employed in the method of supporting the production of application program layout. FIG. 11 is a structure diagram of a message control table 161 adopted in the layout support method.

In this connection, FIGS. 6 to 11 show the respective contents in a case in which the application program of FIG. 3 has already been generated.

In FIG. 6, the program layout control table 150 (FIG. 1) controls records each including an identifier entry 601, a program name entry 602, and a realization name entry 603.

The system (FIGS. 3A and 3B) as the development object includes two programs in this case, namely, a sales manager server program and a sales manager client program. Consequently, there are registered two records corresponding to each other. That is, for the program having "sales manager server" in the program name entry 602, "1" is registered to the identifier entry field 601, and one realization name "A1" is registered to the field of realization name list entry 603 corresponding to "sales manager server". For the program having "sales manager client" in the program name entry 602, "2" is registered to the identifier entry field 601, and one realization name "A100" is registered to the field of realization name list entry 603 corresponding to "sales manager client".

In this case, the realization name is an identifier of the realization control table 151 which is a table to be separately controlled. The layout of the table 151 will be described by referring to FIG. 7.

In FIG. 7, the realization control table 151 (FIG. 1) controls a combination between parts and contains records each including an identifier entry 701, a component data list entry 702, a reference entry 703, and a non-component list entry 704.

The identifier recorded in the identifier entry field 701 is the realization name of the realization name list entry of FIG. 6. For example, realization name "A1" shown in FIG. 6 is assigned as the identifier.

The component data list entry 702 includes a list of component data identifiers controlled by the component data control table 152 (FIG. 8). For example, in relation to the realization name denoted by identifier "A1" in the identifier entry field 701, there are registered "1, 2, 3, 4, 5, 6". These items "1, . . . , 6" are component data identifiers supervised by the component data control table 152 (FIG. 8), which will be described later. Component data items respectively designated by "1, 2, 3, 4, 5, 6" have respective function units including "stock manager", "order manager", "analysis manager", "stock database", "order database", and "analysis database". This indicates a combination of realization of the sales manager server.

The reference entry 703 indicates modification in the realization combination, namely, modification of a realization designated by the identifier. In the initial layout state shown in FIG. 7, the field of reference entry 703 contains a hyphen "-" as a record. This represents reference is not made to any realization. When a new program is produced by a change in the original program, a realization of the original program associated with the change is registered to the reference entry 703.

The non-component list entry 704 indicates any program part which constitutes the realization, but is not regarded as a part. The definition of a program part varies depending on a platform to be used. In general, programs which conduct initial allocation of all parts and event processes are treated as items other than parts. In the configuration of the embodiment, the program parts are also discriminated from programs other than the parts in this meaning. Non-component list "Main 0" registered to the field of non-component list entry 704 for identifier "A1" designates the server main (Server Main) program 310 shown in FIG. 3.

Identifier "A100" stored in the field of identifier entry 701 is identifier name "A100" of FIG. 6. For the realization name identified by identifier "A100" in the field of identifier entry 701, "7, 8, 9" are registered to the component list entry 702. These items "7, 8, 9" are identifiers of component data items supervised by the component data control table 152 (FIG. 8), which will be described later. Component data items designated by "7, 8, 9" are related to function units of "stock screen", "order screen", and "sales data analysis screen", which indicate a realization combination of "sales manager client".

The field of reference entry 703 contains a hyphen "-" in the initial layout state shown in FIG. 7. This denotes that no realization is referred to.

Non-component list "Main 100" registered to the non-component list entry 704 for identifier "A100" indicates the client main (Client Main) program 321 of FIGS. 3A and 3B.

In FIG. 8, the component data control table 152 supervises records each including an identifier entry 801, a component name entry 802, and a function (description) entry, not shown.

The identifier recorded in the field of identifier entry 801 is the realization name of the component data list entry 702 of FIG. 7. For example, the realization name "1, 2, 3, 4, 5, 6" shown in FIG. 7 is registered as the identifier.

The realization name of component name entry 802 is a name to identify component data.

The component name associated with identifier "1" recorded in the field of identifier entry 801 is "stock manager agent (Stock Mgr Agent)", which identifies component data corresponding to the stock manager 314 as a program part shown in FIG. 3. A detailed layout of component data will be described later by referring to FIG. 9.

The component name for identifier "2" stored in the field of identifier entry 801 is "order manager agent (Order Mgr Agent)", which identifies component data corresponding to the order manager 315 as a program part of FIGS. 3A and 3B.

The component name related to identifier "3" in the field of identifier entry 801 is "sales data analysis process agent (Analysis Mgr Agent)", which identifies component data corresponding to the sales data analysis process (Analysis Mgr) 315 as a program part of FIGS. 3A and 3B.

The component name associated with identifier "4" recorded in the field of identifier entry 801 is "stock master database agent (Stock DB Agent)", which identifies component data corresponding to the stock master database (Stock DB) 311 as a program part shown in FIGS. 3A and 3B.

The component name for identifier "5" stored in the field of identifier entry 801 is "order master database agent (Order DB Agent)", which identifies component data corresponding to the order master database (Order DB) 312 as a program part of FIGS. 3A and 3B.

The component name related to identifier "6" in the field of identifier entry 801 is "analysis master database agent (Analysis DB Agent)", which identifies component data corresponding to the analysis master database (Analysis DB) 313 as a program part of FIGS. 3A and 3B.

The component name associated with identifier "7" recorded in the field of identifier entry 801 is "stock screen agent (Stock Clt Agent)", which identifies component data corresponding to the stock screen (Stock Clt) 322 as a program part shown in FIGS. 3A and 3B.

The component name for identifier "8" stored in the field of identifier entry 801 is "order master screen agent (Order Clt Agent)", which identifies component data corresponding to the order screen (Order Clt) 323 as a program part of FIGS. 3A and 3B.

The component name related to identifier "9" in the field of identifier entry 801 is "sales data analysis screen agent (Analysis Clt Agent)", which identifies component data corresponding to the sales data analysis screen (Analysis Clt) 324 as a program part of FIGS. 3A and 3B.

Subsequently, the configuration of the component data 130 will be briefly described by referring to FIG. 9. Incidentally, details of the function will be described later in relation to descriptions of the respective processes.

In this situation, the component data 130 is a permanent data and is hence stored in the auxiliary storage 104 in a state undergone the process of the layout setting program 123.

The component data 130 includes a message delivery program 900, a selection program part entry 910, a candidate list 911, a program example entry 912, a selection program historical list 913, and a log table 914.

Message communication between program parts is reduced to communication between component data items 130. The communication is processed by the message delivery program 900. The program 900 delivers a message to a program acquired from either one of the selection program part entry 910, an element of the candidate list 911, and the program example entry 912. The operation is decided by the programmer and there is prepared a screen interface for the decision.

Stored in the selection program part entry 910 is one program part selected. A program part is directly stored therein or a pointer thereto is stored therein. Functions 920 indicates an entry field for a function list, whereas slots 921 denotes an entry for a list of local data items.

The candidate list 911 provides entries for a plurality of program parts as candidates for a program part to be selected and hence includes a pluralities of entries 930 to 932.

In the program example entry 912, there is stored a program example set according to the message by the user.

Stored in the selection program historical list 913 is program parts selected for the selection program parts entry 910, the program parts being regarded as records. The selection program historical list 913 includes a program part identifier 950 and a realization name 951. Stored in the identifier field 950 is an identifier of a selected program part regarded to be recorded. In the realization name entry 951, there is registered a realization name of the registered identifier.

After a program part is changed, a successful or unsuccessful result of message call for the program execution is recorded in the log table 914. The table 914 contains records each including a message 960, a transmission source 961, and a result 962. Recorded in the message field 960 is the contents of message sent from the transmission source. In the transmission source entry 961, there is stored the transmission source of the message. Recorded in the result field 962 is a successful or unsuccessful result of the message transmission.

Subsequently, the state of the body of program parts control table 160 will be described by referring to FIG. 10. However, the state shown in FIG. 10 is other than the initial state, but is a state when the development is conducted up to the final layout. In the diagram, identifiers 2, 3, and 14 are additionally provided in the final state.

The program parts control table 160 controls profiles in which functions or the like of respective program parts are described and utilization results of the program parts. The body of table 160 contains records each including an identifier entry 1001, a program part classification entry 1002 representing functional classification of the program part, a program name entry 1003, and a connection result list entry 1004.

The program part of the stock manager (Stock Mgr) 314 shown in FIG. 3 is registered as realization name "Stock Mgr" in the field of program name entry 1003. The identifier thereof is specified as "1" in the field of identifier entry 1001.

Since "Stock Mgr" is a program part associated with the stock manager, a profile thereof is registered as "stock manager" in the field of program part classification entry 1002. Program parts respectively having realization names "Stock Mgr M" and "Stock Mgr MM" are obtained by modifying the program part having realization name "Stock Mgr". Therefore, "stock manager" is registered to the field of program part classification entry 1002.

The connection result list entry 1004 indicates program parts to which the program was connected. For example, for the program part "Stock Mgr" for identifier "1", there is denoted that the part was connected to program parts having identifiers 95, 96, 520, and 522.

Identifier "13", of identifier entry 1001 is the identifier of the program part of the order manager (Order Mgr) 315 shown in FIG. 3. Registered to the program part classification entry 1002 is the profile "order manager".

Realization name "Order Mgr" is stored in the program name entry 1003 and the connection result list entry 1004 contains identifiers 124, 125, and 527, which indicates that the program was connected to the program parts related thereto.

For identifier "14" in the identifier entry 1001, an "Order Mgr" program obtained by modifying the "Order Mgr" program is registered to the program name entry 1003, and "order manager" is registered as profile in the program part classification entry 1002. The connection results entry 1004 indicates that the program was connected to program parts having identifiers 125 and 530, respectively.

Identifier "26" in the identifier entry 1001 is the identifier of program part of sales data analysis process (Analysis Mgr) 316 shown in FIG. 3. Registered in the program part classification entry 1002 is "sales data analysis process" as its profile. In the program name entry 1003, there is stored realization name "Analysis Mgr". The connection results entry 1004 denotes that the program was connected to program parts respectively having identifiers 127 and 535.

Identifier "95" in the identifier entry 1001 is the identifier of program part of stock master database (Stock DB) 311 shown in FIG. 3. Registered in the program part classification entry 1002 is "sock manager master" as its profile. In the program name entry 1003, there is stored realization name "Stock DB". The connection results entry 1004 denotes that the program was connected to program parts respectively having identifiers 1, 2 and 3.

Identifier "124" of the identifier entry 1001 denotes the identifier of program part of order manager master database (Order DB) 312 shown in FIG. 3. Stored in the program part classification entry 1002 is "order manager master" as its profile. In the program name entry 1003, there is registered realization name "Order DB". The connection results entry 1004 designates that the program was connected to program part having identifier 13.

Identifier "127" in the identifier entry 1001 is the identifier of program part of sales data analysis master database (Analysis DB) 313 shown in FIG. 3. Registered in the program part classification entry 1002 is "sales data analysis manager master" as its profile. In the program name entry 1003, there is stored realization name "Order DB". The connection results entry 1004 denotes that the program was connected to program part having identifier 28.

Identifier "520" in the identifier entry 1001 is the identifier of program part of stock manager screen (Stock Clt) 322 shown in FIG. 3. Registered in the program part classification entry 1002 is "stock manager screen" as its profile. In the program name entry 1003, there is stored realization name "Stock Clt". The connection results entry 1004 denotes that the program was connected to program part having identifier 1.

Identifier "527" of the identifier entry 1001 denotes the identifier of program part of order manager screen (Order Clt) 323 shown in FIG. 3. Stored in the program part classification entry 1002 is "order manager screen" as its profile. In the program name entry 1003, there is registered realization name "Order Clt". The connection results entry 1004 designates that the program was connected to program parts respectively having identifiers 13 and 15.

Identifier "535" in the identifier entry 1001 is the identifier of program part of sales data analysis screen (Analysis Clt) 324 shown in FIG. 3. Registered in the program part classification entry 1002 is "sales data analysis screen" as its profile. In the program name entry 1003, there is stored realization name "Analysis Clt". The connection results entry 1004 denotes that the program was connected to program part having identifier 28.

Identifier "main 0" of the identifier entry 1001 denotes the identifier of program part of server main (Server Main) 310 shown in FIG. 3. Stored in the program part classification entry 1002 is "sales manager serve control" as its profile. In the program name entry 1003, there is registered realization name "Server Main". The connection results entry 1004 designates that the program was connected to program parts respectively aving identifiers 1, 13, 28, 95, 124, and 127.

Identifier "Main 100" in the identifier entry 1001 is the identifier of program part of client main (Client Main) 321 shown in FIG. 3. Registered in the program part classification entry 1002 is "sales manager client control" as its profile. In the program name entry 1003, there is stored realization name "Client Main". The connection results entry 1004 denotes that the program was connected to program parts respectively having identifiers 520, 527, and 535.

Information of connection results recorded in the connection results list entry 1004 can be used as reference for the new application layout. That is, thanks to utilization results recorded in the program part records, there are recorded applications used in the past. Moreover, for each part, there are recorded combinations used with other parts. As a result, there can be re-constructed a favorable combination utilized, namely, a layout having a high performance. Referring to the restored combination, a new application layout can be obtained.

As a method of actually using each program part, an identifier of the program part is externally called with a message (function/method call).

Referring now to FIG. 11, the layout of message control table 161 will be described.

The message control table 161 is a table to control, for each program part, messages to be processed by the program part. The table 161 contains records each including a identifier entry 1101, an identifier entry of program part table 1102, a message name entry 1103, an entry of number of arguments (Arg (Argument) Count) 1104, and first to third arguments for respective data types, namely, a first argument (Argument 1) entry 1105, a second argument (Argument 2) entry 1106, and a third argument (Argument 3) entry 1107.

For example, messages controlled by the record with identifier 1 is related to program part 1 (Stock Mgr) for which "1" is registered in the identifier entry 1001 in the body of program parts control table 160. Moreover, as indicted by "Add" in the message name entry, there is provided an "Add" message interface. Argument "2" is specified as indicated in the Arg Count entry 1104. The first argument is of an item type as registered in the Argument 1 entry 1105 and the second argument is of an integer type as registered in the Argument 2 entry 1106. Consequently, the messages can be called in the format of ADD(Item,int).

Additionally, "Stock Mgr" for identifier "1" recorded in the program part control identifier 1302 has message interfaces including "Add", "Remove", and "Refer".

According to the configuration of the embodiment, when connection results are recorded in the connection results list as program parts records, applications used in the past can be recognized. Moreover, for each part, there can be indicated the utilized combinations with other parts. Consequently, there can be re-constructed a favorable combination utilized, namely, a layout having a high performance. Referring to the restored combination, it is possible to obtain a new application layout.

[5. Production and execution of application program initial layout including component data]

Referring now to FIGS. 2, 6, 7, and 9 as well as FIGS. 12 to 15, description will be given of creation and execution of an application program initial layout including component data.

Figure 12:
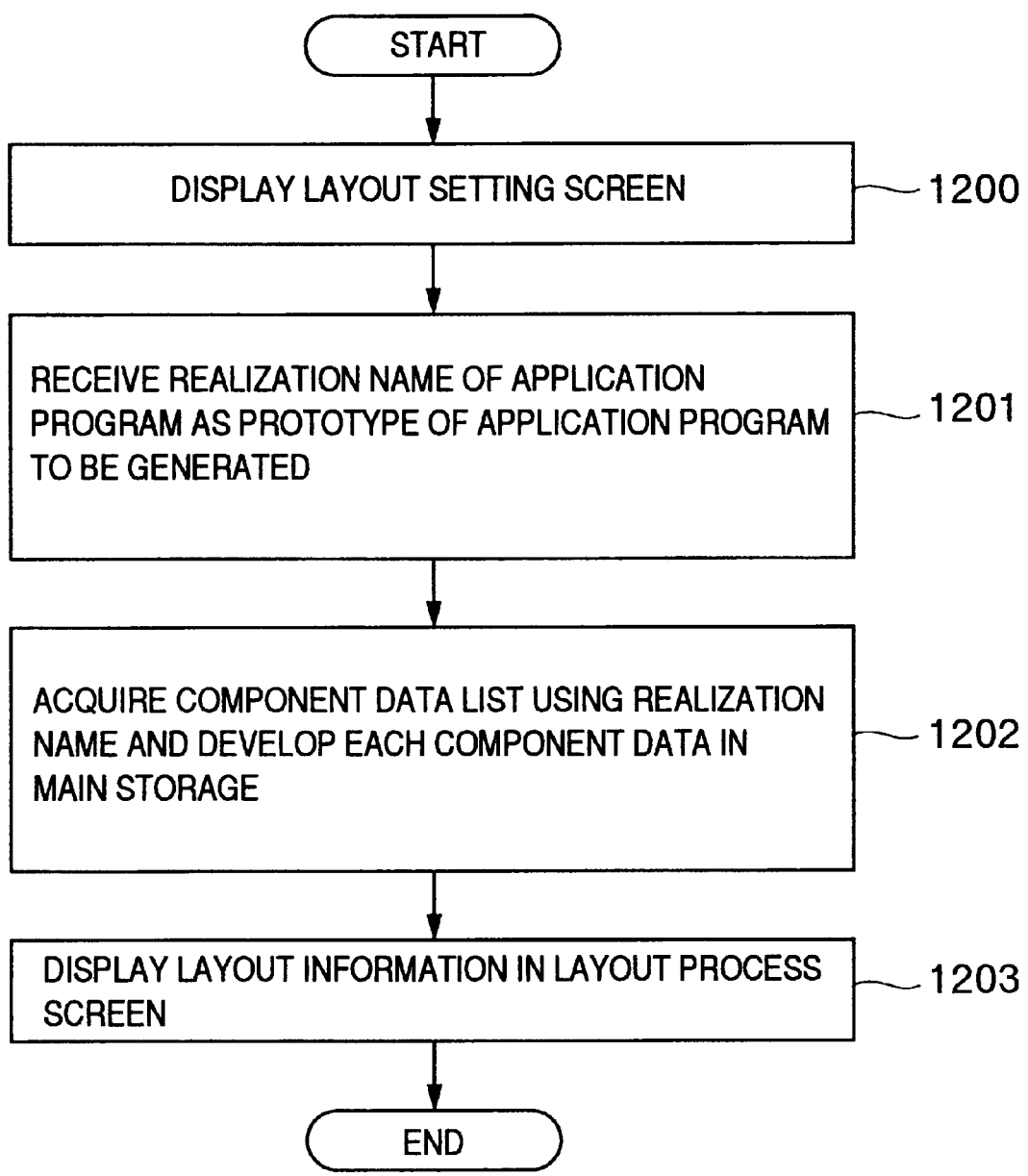
FIG. 12 is a detailed flowchart of an initialization process step 201 for use with the embodiment of a method of supporting production of an application program layout in accordance with the present invention.
Figure 13:
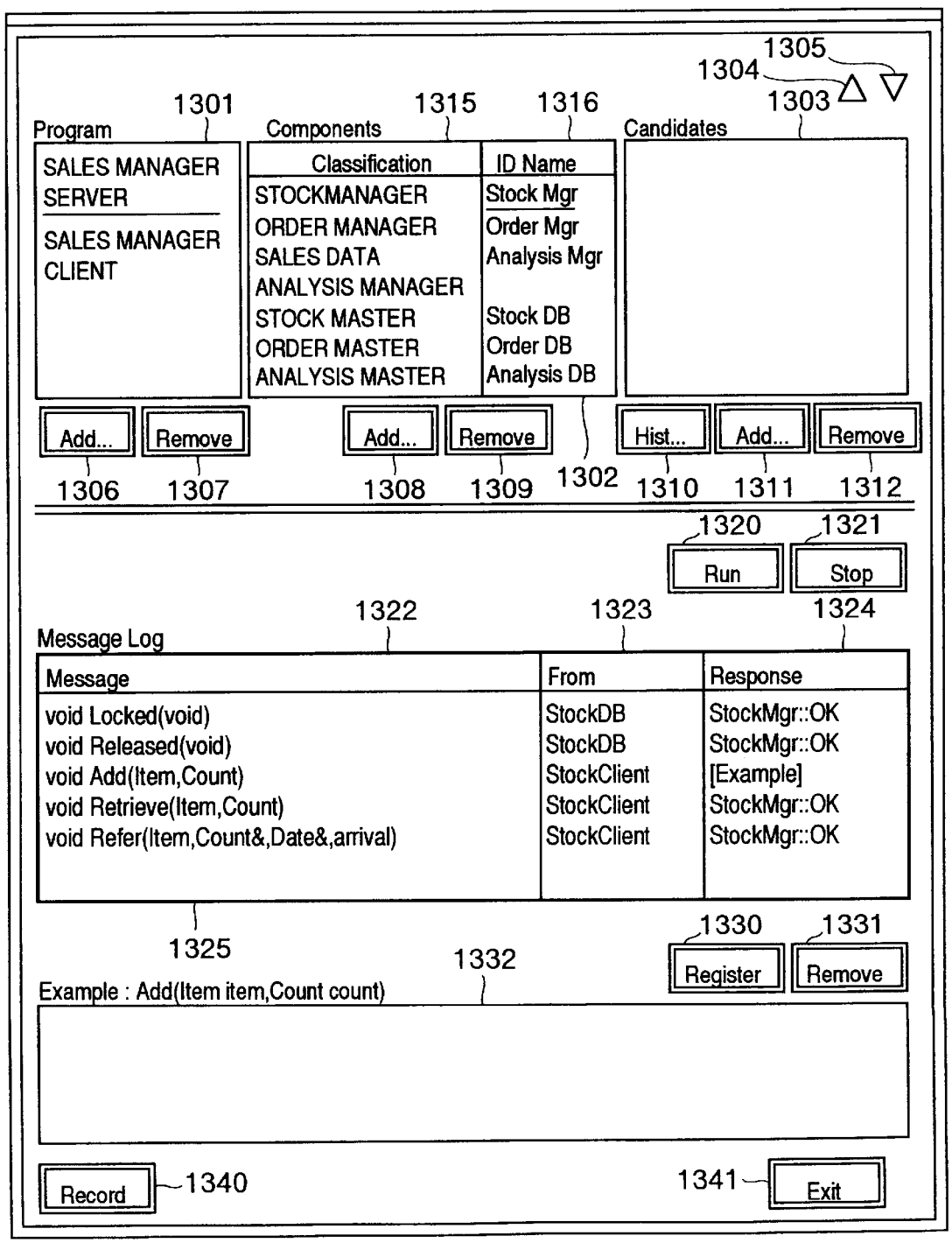
FIG. 13 is a configuration diagram of a detailed screen layout of a layout setting screen 110 to be displayed in the embodiment of a method of supporting production of an application program layout in accordance with the present invention.
Figure 14:
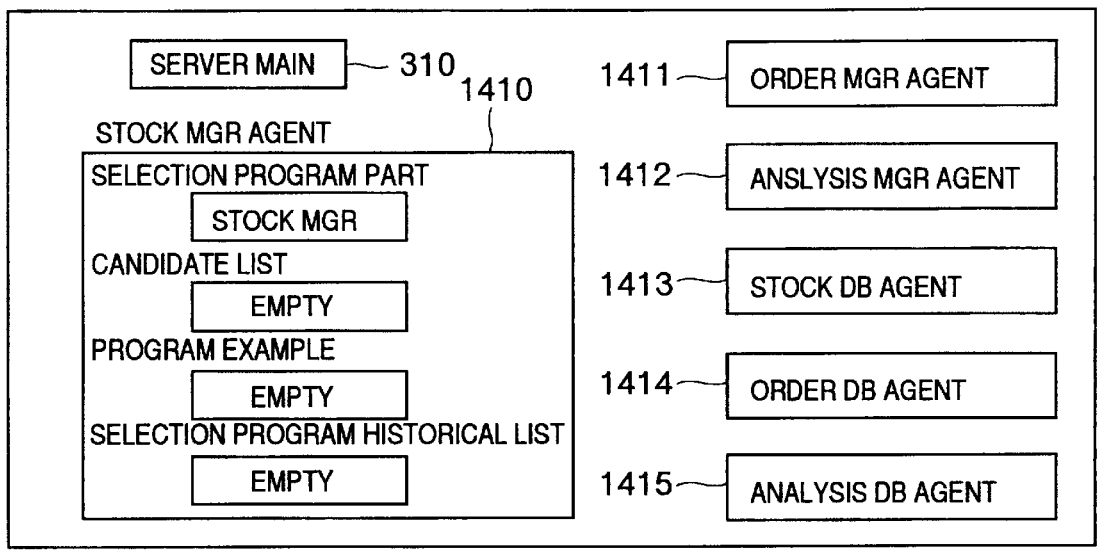
FIG. 14 is a layout diagram of a sales manager server program as an initial application program constructed in the embodiment of a method of supporting production of an application program layout in accordance with the present invention.
Figure 15:
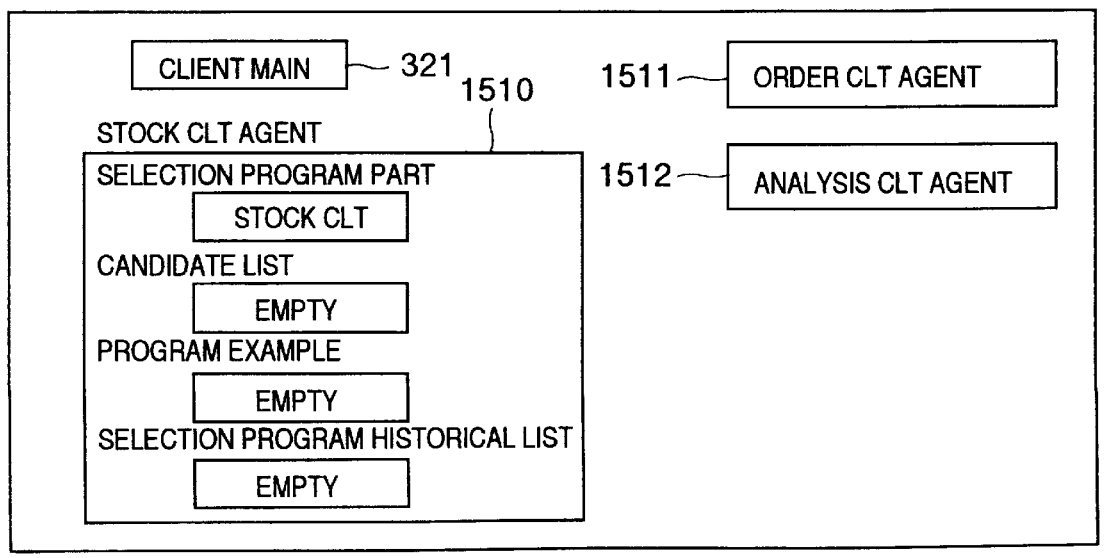
FIG. 15 is a layout diagram of a sales manager client program as an initial application program constructed in the embodiment of a method of supporting production of an application program layout in accordance with the present invention.

FIG. 12 is a detailed flowchart of an initialization process step 201 employed in the embodiment of the method of supporting production of application program layout according to the present invention. FIG. 13 is a detailed configuration diagram of the screen layout of a layout screen displayed in the embodiment of the method of supporting production of application program layout. FIG. 14 is a layout diagram of a sales manager server programmer as an initial application program constructed according to the embodiment of the method of supporting production of application program layout. FIG. 15 is a configuration diagram of a sales manager client program as an initial application program constructed according to the embodiment of the method of supporting production of application program layout.

When the layout setting program 123 is started, the initialization process of step 201 of FIG. 2 is first activated. In this process, the initial layout of the application program shown in FIG. 3 is specified such that inputs are supplied to modify the initial layout. Since details of step 201 is shown in FIG. 12, description will be subsequently given of operation according to the flowchart of FIG. 12.

In step 1200, the layout setting screen 110 is first presented on the display 101 of FIG. 1. Referring now to FIG. 13, description will be given in detail of the screen layout of the layout setting screen 110. In this connection, FIG. 13 shows a state obtained when the design is proceeded to some extent, and the difference with respect to the initial screen will be described in the following paragraphs.

The layout setting screen 110 is subdivided into several sub-screens. Design information is displayed in sub-screens such that the contents of such information are altered to complete the design. The sub-screens include a program (Program) sub-screen 1301 to display application program names, a component (Components) sub-screen 1302 to display a plurality of component data items constituting application programs, a candidate (Candidates) sub-screen 1303 to display a plurality of candidate program parts for respective component data items, a message log (Message Log) sub-screen 1325 to display records of message transmission, and a program example (Example) sub-screen 1332 to display a program example to be set according to the message by the user.

In this regard, the component (Components) sub-screen 1302 includes a classification (Classification) screen 1315 to display classifications of program parts and a program name (ID Name) screen 1316 to display program names of program parts.

Additionally, displayed below the program (Program) sub-screen 1301 are an Add button 1306 to add an application program and a Remove button 1307 to remove a program. Below the component (Components) sub-screen 1302, there are displayed an Add button to add a program part and a Remove button 1309 to remove a program part.

Presented below the candidate (Candidates) sub-screen 1303 are a History button 1310 to refer to a realization example in the past, an Add button 1311 to add a candidate program, and a Remove button 1312 to remove a candidate program. Over the candidate (Candidates) sub-screen 1303, there are displayed an upward arrow button 1304 and a downward arrow button 1305 to alter the execution priority sequences of a plurality of candidate program parts displayed in a candidate list.

Displayed below the message log sub-screen 1325 are an execution (Run) button 1320 to indicate execution of an application program and an execution termination (Stop) button 1321 to indicate termination of program execution.

Over the program example. (Example) sub-screen 1332, there are presented a Register button 1330 to indicate registration of a program example set by the user and a Remove button 1331 to remove a program example set by the user.

Additionally presented in the lower-most zone of the layout setting screen are a Record button 1340 operable when evaluation of program parts results in a layout to be recorded to indicate recording of the new layout and an Exit button 1341 to pass control from the layout setting program to another program.

Incidentally, at a stage where the layout setting screen is displayed in the initial process of step 1200, information items of the Program sub-screen 1301, Components sub-screen 1301, and Message Log sub-screen 1325 are still missing.

In step 1201, there is received a realization name of the application program as the source of an application program as the object of production.

In this situation, as can be appreciated from the initial layout shown in FIG. 3, there are required two programs, i.e., sales manager server and client programs. Therefore, realization names "A1" and "A100" of these programs (sales manager server and client) are inputted to the system. These names are inputted via a dialog window separately displayed.

In step 1202, a component data list is acquired according to the realization names and then respective component data items are developed in the main storage to configure an application program.

Namely, according to the input realization names "A1" and "A100", records are obtained from the program layout control table 150 (FIG. 6). Since the realization names "A1" and "A100" respectively correspond to identifiers "1" and "2" of identifier entry 601 of FIG. 6, these records are acquired.

Furthermore, from the realization control table 151 (FIG. 7), there are obtained records having the respective realization names to acquire associated component data lists. In the records of FIG. 7, component data "1, 2, 3, 4, 5, 6" is related to realization name "A1" in the identifier entry 701 and component data "7, 8, 9" is associated with realization name "A100" in the identifier entry 701.

Subsequently, in association therewith, records are attained from the component data control table 152 (FIG. 8). In FIG. 8, records having realization name "1, 2, 3, 4, 5, 6" in the identifier entry 801 are "stock manager agent (Stock Mgr Agent)", "order manager agent (Order Mgr Agent)", sales data analysis process agent (Analysis Mgr Agent)", stock master database agent (Stock DB Agent)", order master database agent (Order DB Agent)", and analysis master database agent (Analysis DB Agent)". Additionally, records having realization name "7, 8, 9" in the identifier entry 801 are "stock screen gent (Stock Clt Agent)", order screen agent (Order Clt gent)", and sales data analysis screen agent (Analysis Clt Agent)".

Subsequently, there are obtained component data 130 for each of the component names to thereby construct an application program.

The component data 130 includes a selection program historical list 913 (FIG. 9). In the table of selection program historical list 913, realization names are recorded in fields of realization name entry 951. From the table, a record matching the inputted realization name is acquired. Thereafter, a program part obtained from the program part identifier entry 1001 of the body of program parts control table 160 (FIG. 10) is set to the selection program part entry 910. For example, for the component data 130 of "Stock Mgr Agent", the program part of "Stock Mgr" is attained according to the inputted realization name and is then set to the selection program part entry 910. Similarly, program parts are also attained for the component data items and are then set as the selection program parts.

As a result of the process above, an initial application program is constructed.

The layout of the initial application program thus constructed will be described by referring to FIGS. 14 and 15.

FIG. 14 is a configuration diagram of the sales manager server program as the initial application program, whereas FIG. 15 is a constitution diagram of the sales manager client program as the initial application program.

In FIG. 14, the sales manager server program 300 includes a set of such agents, i.e., component data items each including program parts as Stock Mgr Agent 1410, Order Mgr Agent 1411, Analysis Mgr Agent 1412, Stock DB Agent 1413, Order DB Agent 1414, and Analysis DB Agent 1415 and the Server Main program 310 not included in the set of agents.

The internal structure of component data 130 is as shown in FIG. 9. The initial state thereof is as follows. For example, in the internal configuration of Stock Mgr Agent 1410, "Stock Mgr" is stored in the field of selection program part entry and the candidate list entry, program example entry, and selection program historical list are in the "empty" state as shown in FIG. 14.

This similarly applies to the other component data items 1411 to 1415 such that the initial program parts are respectively stored in the fields of selection program part entry and the candidate list entry, program example entry, and selection program historical list are in the "empty" state.

In FIG. 15, the sales manager client program 301 includes a set of such agents, namely, component data items each including program parts as Stock Clt Agent 1510, Order Clt Agent 1511, and Analysis Clt Agent 1512 and the Client Main program 321 not included in the set of agents.

For example, the internal structure of component data 130 is as shown in FIG. 15. In the field of selection program part entry, there is stored "Stock Clt" and the candidate list entry, program example entry, and selection program historical list are in the "empty" state.

Similarly, for the other component data items 1511 and 1512, the initial program parts are respectively stored in the fields of selection program part entry and the candidate list entry, program example entry, and selection program historical list are in the "empty" state.

Next, in step 1203, the layout of the application program constructed in step 1202 is presented in the layout setting screen 110 (FIG. 13).

As a result of step 1203, information items are displayed in the Program sub-screen 1301 and Components sub-screen 1302.

The screen display of FIG. 13 indicates the following meanings. Items "sales manager server" and "sales manager client" in Program sub-screen 1301 denote that the system includes two programs, i.e., sales manager server and client programs.

The underscore in "sales manager server" designates that the sales manager server program has been selected from the two programs. The layout of program parts of the selected program is displayed in Components sub-screen 602.

In the sub-screen 602, it is indicated that the server program includes six sets of part functions. Of these groups of functions, the function of stock manager is actually provided by a program part entitled "Stock Mgr". The function of order manager is provided by a program part called "Order Mgr". The function of sales data analysis is actually provided by a program part entitled "Analysis Mgr". The function of stock master is provided by a program part called "Stock DB". The function of order master is actually provided by a program part entitled "Order Db". The function of analysis master is provided by a program part called "Analysis DB".

"Stock manager" and "Stock Mgr" are underscored and is hence selected. Consequently, when there exists any candidate program part to be actually provided, a candidate list is displayed in Candidates sub-screen 1303. However, no candidate is displayed in this case for the following reasons. Namely, immediately after the start of process, there are missing candidate parts indicated for replacement.

The contents of display of FIG. 13 can be altered as follows. In this connection, the process is complicated and is not therefore shown in the processing flow of the layout setting process for simplicity of the flowchart.

When a program name is selected in Program sub-screen 1301 by the mouse 106, component data items constituting the program are presented in Components sub-screen 1302. In this sub-screen 1302, when a component or part name is selected by the mouse 106, substitute candidates of the component are displayed in Candidates sub-screen 1303. The selection in Component sub-screen 1302 and that of the program part in Candidates sub-screen 1303 mean the selection of the parts, which is associated with the display in Message Log table 914, which will be described later, and operation to select a object of setting in the program example 1332.

Addition and removal of a program are accomplished by activating Add button 1306 and Remove button 1307 by the mouse 106. Addition and removal of a program part are accomplished by activating Add button 1307 and Remove button 1308 by the mouse 106. Addition and removal of a candidate program and reference to a realization example in the past are accomplished by activating Add button 1311, Remove button 1312, and History button 1310 by the mouse 106.

Additionally, alteration of priority level of a candidate part is carried out by invoking the upward arrow button 1304 or the downward arrow button 1305 by the mouse 106.

[6. Process of controlling execution of initial application]

Next, the procedure of executing the application in the initial layout will be described by referring to FIGS. 2, 9, 11, 13, and 14 and FIGS. 16 to 18.

Figure 16:
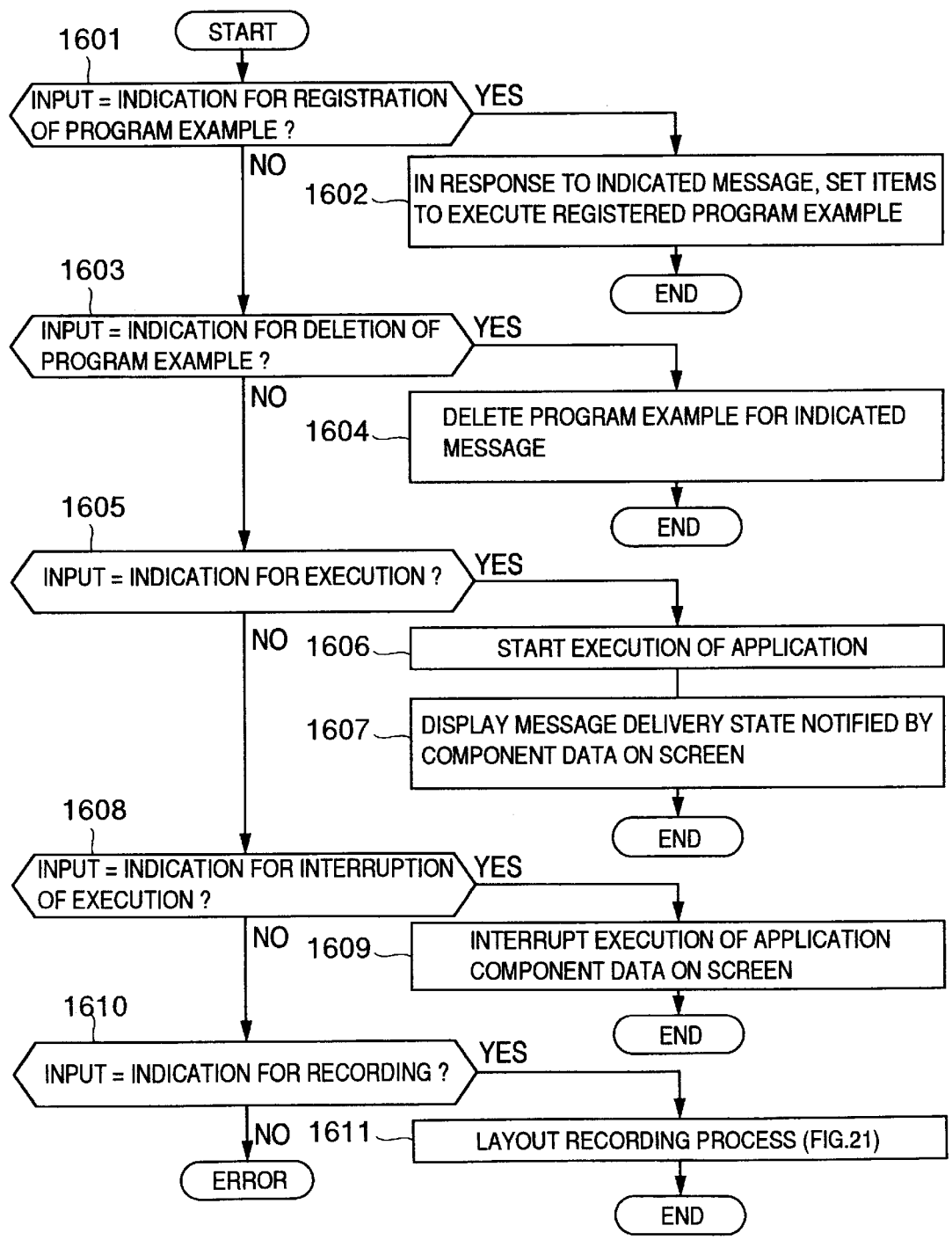
FIG. 16 is a detailed flowchart of a step of application program execution control process 208 for use in the embodiment of a method of supporting production of an application program layout in accordance with the present invention.
Figure 17:
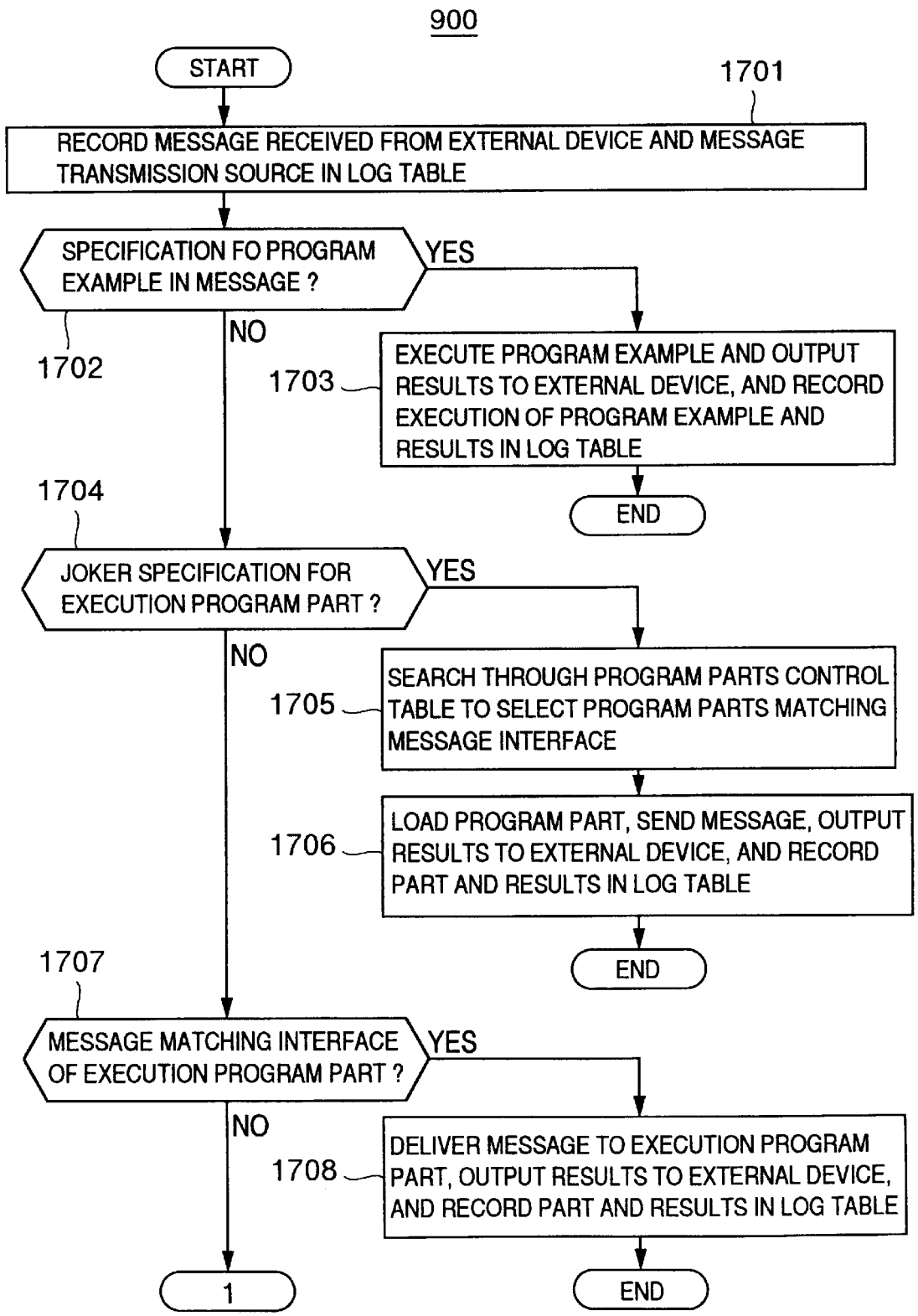
FIG. 17 is a flowchart of a message delivery program for use in the embodiment of a method of supporting production of an application program layout in accordance with the present invention.
Figure 18:
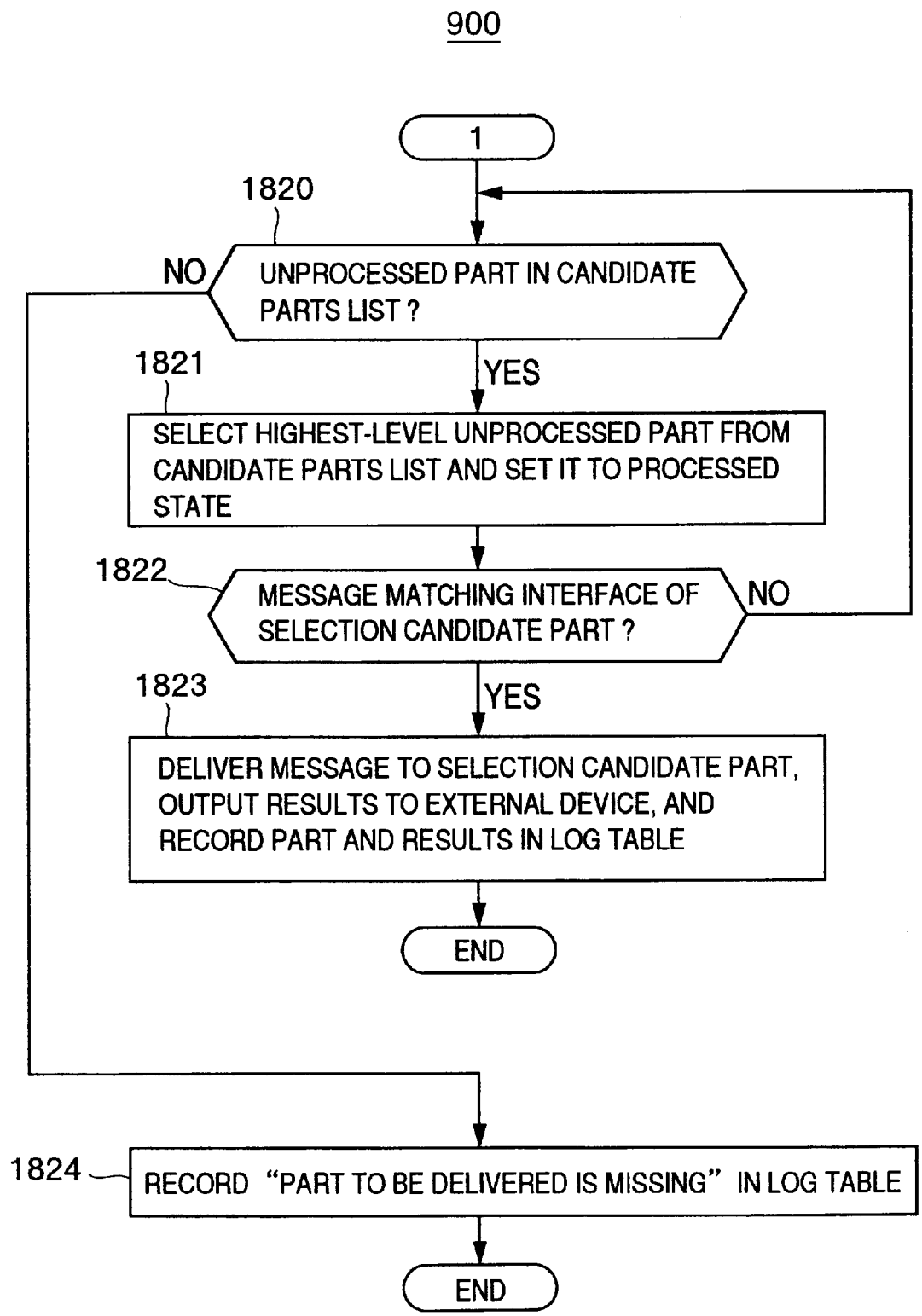
FIG. 18 is a flowchart following FIG. 17 of the message delivery program for use in the embodiment of a method of supporting production of an application program layout in accordance with the present invention.

FIG. 16 is a detailed flowchart of a step of process to control execution of application program 208 used in the embodiment of the method of supporting production of application program layout according to the present invention. FIG. 17 is a flowchart of a message delivery program adopted in the embodiment of the method of supporting production of application program layout. FIG. 18 is a flowchart following the flowchart of the message delivery program of FIG. 17 employed in the embodiment of the method of supporting production of application program layout.

To execute the application in the initial layout shown in FIG. 14, Run button 1320 is clicked by the mouse in the state in which "sales manager server", "stock manager", and "Stock Mgr" are selected (underscored) as shown in FIG. 13.

As a result, decision in step 207 of the layout setting program shown in FIG. 2 results in Yes and hence step 208 is initiated to conduct the program of controlling execution of application program. FIG. 16 shows details of step 208.

The flowchart of FIG. 16 will be now briefly described. This flowchart is of an event flow type in which a process is started in accordance with the contents of input data.

When Register button 1330 (FIG. 13) is clicked by the mouse 106, the input data is decided to be indication for registration of a program example in step 1601 and then the indicated message is registered in step 1602 to start the process to execute the registered program example.

When Remove button 1331 (FIG. 13) is clicked using the mouse 106, the input is assumed as indication for removal of a program example in step 1603 and then a program example related to the indicated message is removed in step 1604 to initiate the process to execute the execution part.

When Run button 1320 (FIG. 13) is clicked by the mouse 106, the input data is decided to be indication for execution and hence steps 1606 and 1607 are executed. These steps will be described later.

When Stop button 1321 (FIG. 13) is clicked using the mouse 106, the input is assumed as indication for interruption of execution in step 1608 and then a process to terminate execution of the application program is commenced in step 1609.

When Record button 1340 (FIG. 13) is clicked using the mouse 106, the input is assumed as indication for recording in step 1610 and then a process of recording layout is initiated in step 1611.

Incidentally, as described above, Run button 1320 is clicked by the mouse. In this connection, steps 1606 and 1607 will be described in detail in the following paragraphs. Moreover, steps 1602, 1604, 1609, and 1611 will be described in detail separately in [11. Setting of program example] and [8. Recording of layout].

In step 1606, execution of the application program is started.

The sales manager server program 300 shown in FIG. 14 includes Server Main program 310 as a connection program and six component data items 1410 to 1415. As already described above, the component data, Stock Mgr Agent 1410 representing the part function of stock manager includes "Stock Mgr" as a selection program part.

Resultantly, the program shown FIG. 14 is generated and then its execution is started.

When the application program includes screens like the sales manager client program 301 (FIG. 3), the application program screen 111 is presented in the display 101 (FIG. 1).

Even when the application program includes component data, the characteristic of the program is not particularly changed, namely, the program itself conducts operation as if the program includes parts. This is because the message delivery program 900 shown in FIG. 9 delivers messages to selection program parts in the initial layout.

The process of message delivery program will be now briefly described by referring to the flowchart of FIG. 17. This flowchart is of an event flow type to commence the process according to the contents of input data.

In the process of executing a program, there is conducted a message delivery such that a message externally received and a delivery source thereof are recorded in the log table 914 (FIG. 9) in step 1701.

In step 1702, a decision is made for program example specification. When Yes results, the process of program example specification is executed in step 1703. Step 1703 is a decision step for joker specification. When this step results in Yes, the process of joker specification is executed in steps 1705 and 1706. In this connection, details of steps 1703, 1705, and 1706 will be separately described in [11. Setting of program example] and [10. Setting of joker parts].

At execution of the application program in the initial layout, steps 1702 and 1704 result in "No" and hence control is passed to step 1707.

In step 1707, it is decided whether or not the message matches the interface of program part for execution.

Since the application program in the initial layout has been already operated as shown in FIG. 3, step 1707 results in "Yes".

For decision in step 1707, an access is made to information of message control table 161 (FIG. 11) associated with the program parts control table. Recorded therein are all of the program parts and message interface of the respective program parts. For example, it can be seen from the table shown in the diagram that the program part control identifier 1102 is "1" for Stock Mgr program part and there are provided message interfaces 1103 of "Add", "Remove", and "Refer". Moreover, the "Add" message includes two arguments in which the first and second arguments are of the item and integer types, respectively. Consequently, by referring to the message control table 161, whether or not the message matches the interface of program part for execution can be determined.

In step 1708, the message is delivered to the execution program part and then a successful or unsuccessful result of message delivery is outputted to an external device. The output to external device may be achieved by a down-load operation of the notification in a storage or an operation to produce a print-out document by a printer. Furthermore, the execution program part and message delivery result are recorded in the log table 914 of the component data 130 (FIG. 9).

In this regard, the message communicated between program parts during the execution are recorded in the log table 914 of the component data 130. This is also accomplished by the message delivery program 900.

Incidentally, the steps beginning at step 1820 shown in FIG. 18 to follow step 1707 are associated with the handling of program parts selected as candidates in the candidate list. Details of the contents thereof will be separately described in [9. Setting a plurality of candidate program parts].

Next, returning to step 1607 of FIG. 16, the message delivery state notified from the component data 130 is displayed on the screen in the step. That is, the contents of log table 914 are sequentially reported to the layout setting program 123, which displays the contents in the layout setting screen 110 (FIG. 13).

Message Log screen 1325 of layout setting screen 110 includes Message field 1322, From field 1323, and Response field 1324. Message field 1322 presents the contents of message delivered, From field 1323 displays the message delivery source, and Response field 1324 indicates the message delivery state.

Five message log items shown in Message Log screen 1325 of FIG. 13 denote the following message deliver state. According to the first line, Stock Mgr program part received message "Locked" from Stock DB program part and the message delivery was normally conducted (OK). The second line indicates that Stock Mgr program part received message "Released" from Stock DB program part and the message was normally delivered (OK). In accordance with the third line, Stock Mgr program part received message "Add" from Stock Clt program part and the message delivery was normally conducted (OK). The fourth line indicates that Stock Mgr program part received message "Retrieve" from Stock Clt program part and the message was normally delivered (OK). According to the fifth line, Stock Mgr program part received message "Refer" from Stock Clt program part and the message delivery was normally conducted (OK).

The message log items are the contents of messages reported from "Stock Mgr Agent" selected as a part function. When another part function is selected, the display log items can be changed.

[7. Change of program parts]

Next, the procedure of checking substitute layout by altering program parts of the initial layout will be described by referring to FIGS. 2, 4, 9, 10, 13, 19, and 20.

Figure 19:
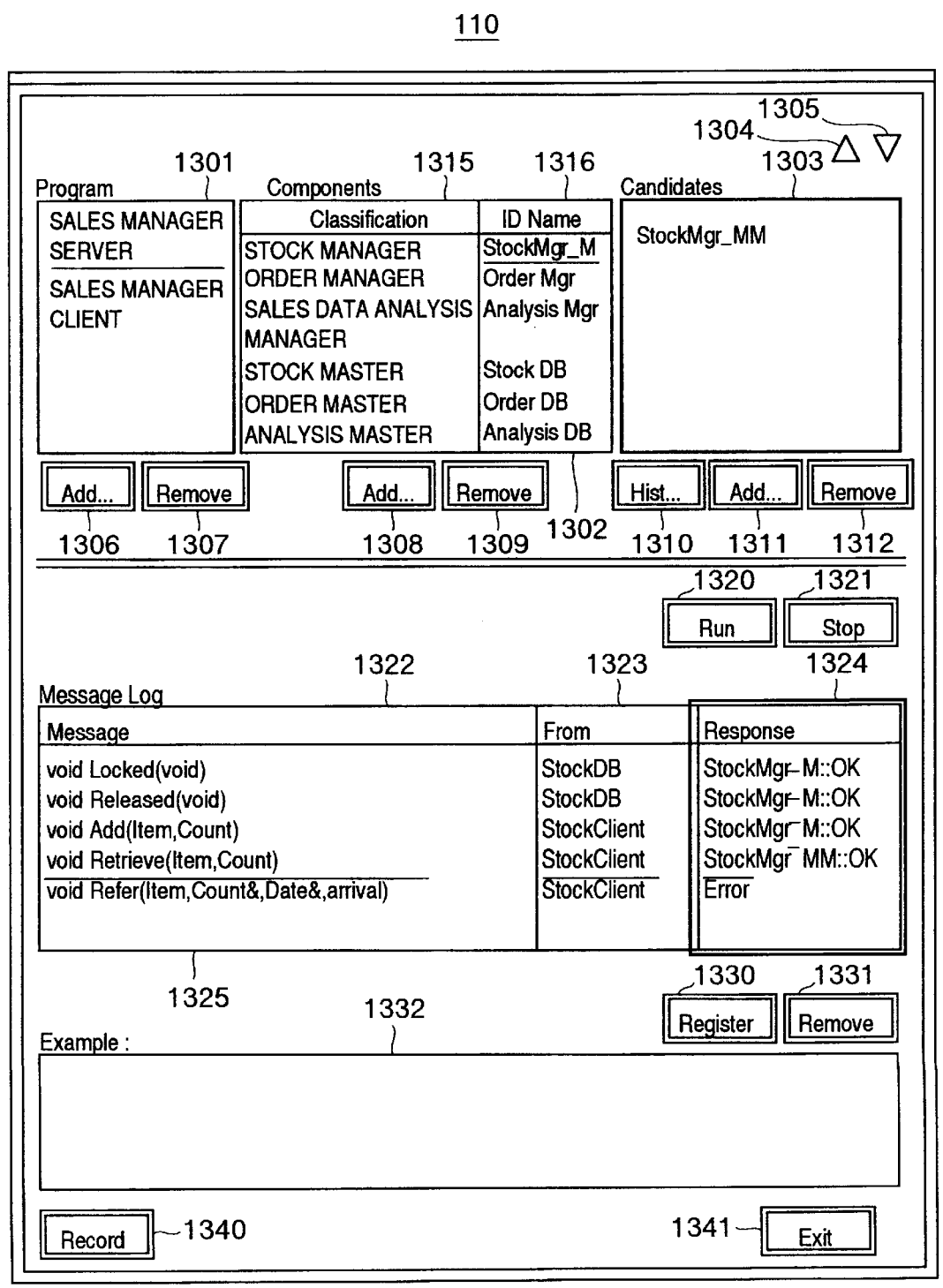
FIG. 19 is a configuration diagram of a detailed screen layout of a layout setting screen 110 displayed in the embodiment of a method of supporting production of an application program layout in accordance with the present invention.
Figure 20:
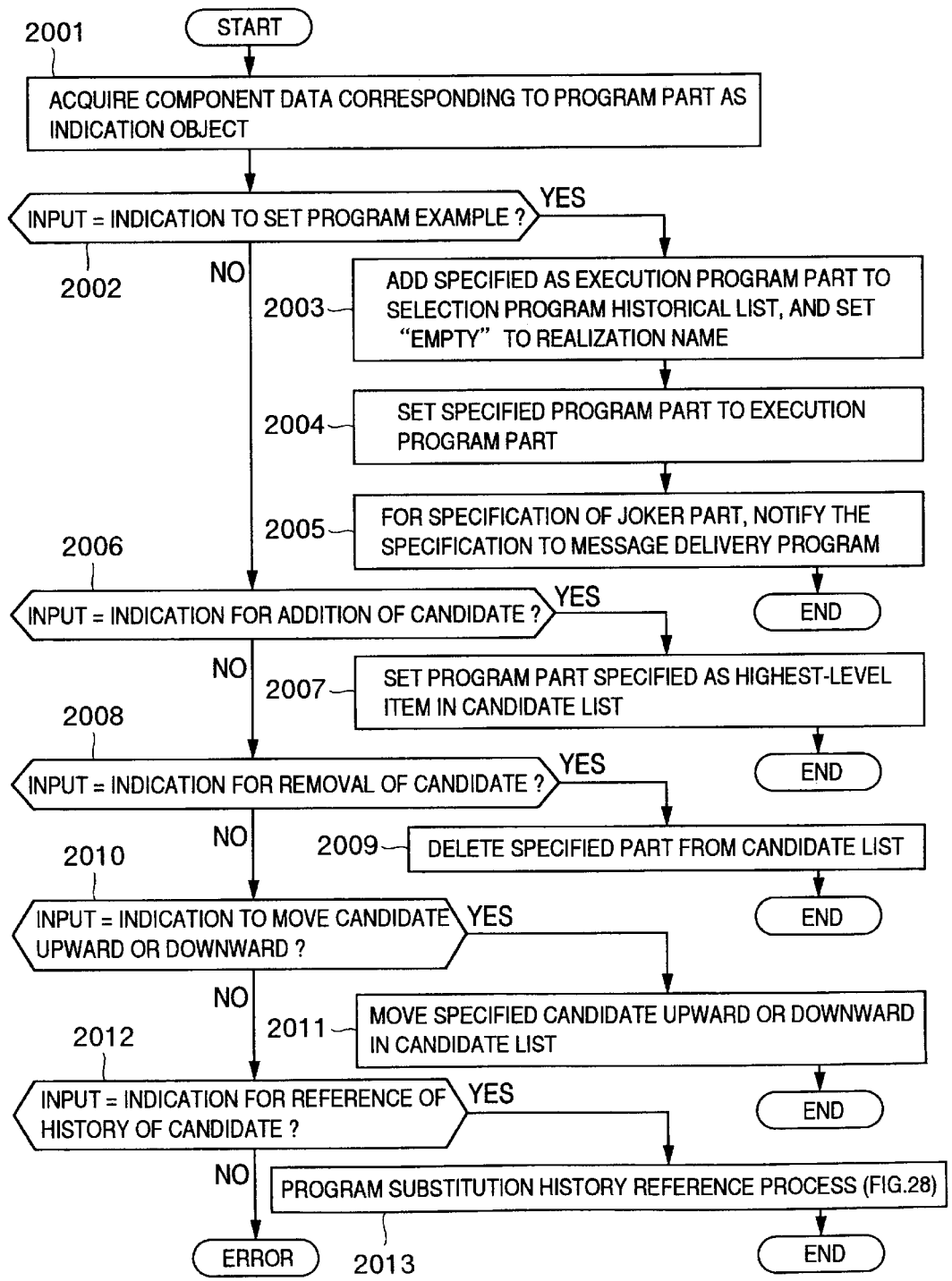
FIG. 20 is a detailed flowchart of a step of component data setting process 206 for use in the embodiment of a method of supporting production of an application program layout in accordance with the present invention.

FIG. 19 is a detailed layout diagram the screen configuration of the layout setting screen 110 displayed in the embodiment of the method of supporting production of application program layout according to the present invention. FIG. 20 is a detailed flowchart of a step of process to set component data 206 employed in the embodiment of the method of supporting production of application program layout.

In this case, as shown in the process from the initial layout to substitute layout 1 of FIG. 4, the change or replacement of manager parts are discussed. In other words, it is assumed that the adoption of "Stock Mgr" as a program part in the initial layout has been evaluated to be insufficient in performance or function (through an execution).

In this situation, introduction of another program part is checked. Discussion will be made for modification of Stock Mgr program part for use (after re-programming thereof) or introduction of a program part used in another realization. In the configuration of the embodiment, it is assumed that the discussion results in the introduction of a program part used in another realization. However, the modification of a program part can also be interpreted as development of another program part. Consequently, when the modification of a part is regarded as a process in which the part is separately developed as another realization and is recorded in the program parts control table, the modification and introduction can be handled in a similar manner.

In this case, it is assumed that there exists Stock Mgr__M as available another stock manager program part. This is recorded as identifier "2" in the identifier entry 1001 of the program parts control table 160 (FIG. 10).

In accordance with the present embodiment, to replace Stock Mgr program part with Stock Mgr__M program part, there is selected a part name and then the name is changed from the keyboard. That is, in the state of layout setting screen 110 shown in FIG. 13, Stock Mgr of ID Name 1316 is clicked in Components sub-screen 1302 by the mouse 106 to thereby select Stock Mgr program part (there appears a state in which Stock Mgr is underscored as shown in FIG. 13). Thereafter, the keyboard 105 is operated to add "__M" at the end of program part name "Stock Mgr".

As a result of the change operation of program part above, the contents of display of the layout setting screen are changed as shown in FIG. 19. In this connection, the contents of Candidates sub-screen 1303 and Message Log sub-screen 1325 represent process results, which will be described. The contents thereof will be described later in [9. Setting of a plurality of candidate program parts].

When the change operation of program part is accomplished, the layout setting program 123 (FIG. 1) receives an input from the user in step 202 of the flowchart shown in FIG. 2. Moreover, in step 205, the input is regarded as specification for layout of program part and then control is passed to step 206. In this step, the process of setting component data is started.

Details of the process of setting component data are shown in the flowchart of FIG. 20.

In step 2001 of FIG. 20, there is acquired component data corresponding to the program part as the indication object and then a process is carried out for the obtained component data.

In step 2002, the input operation to add "__M" is regarded as indication for setting program part Stock Mgr__M and therefore execution program part Stock Mgr Agent is changed to Stock Mgr__M. Control is then transferred to step 2003.

In step 2003, the item specified in relation to the execution program part is added to the selection program historical list 913 of component data 130 (FIG. 9) and then "Empty" is set as the realization name. That is, program part Stock Mgr previously selected is added to the historical list 913. Since program part Stock Mgr has identifier "1", "1" is additionally set to the field of program part identifier entry 915. However, "Empty" is set to the realization name entry 951 associated therewith.

In step 2004, the specification program part is set to the execution program part. Namely, "Stock Mgr__M" is registered to the field of selection program part entry 910 of component data 130.

Incidentally, step 2005 is a process for a joker part. Since the new program part name is other than the joker name, step 2005 is skipped. The case of joker part will be described later in [10. Setting of joker parts].

As a result of operations above, the program parts are completely changed. After this point, the program can be executed in this layout for evaluation thereof. This can be accomplished in a procedure identical to that described above in conjunction wit the program execution in the initial layout. However, since new program parts are set in this case, it is not guaranteed that all message calls are successfully achieved. The successful or unsuccessful message call is displayed as a message log in the layout setting screen. In this regard, the display contents of Message Log sub-screen 1325 of FIG. 19 represent process results including candidates of the program part, which will be described later. The contents thereof will be describe later in [9. Setting of a plurality of candidate program parts].

The display results of message log can be used as the reference for evaluation of the layout. When the evaluation results in "Failure", it is necessary to modify the program, namely, the programming job is to be achieved until all evaluation steps result in "Success". In relation to the configuration of the embodiment, the job is not described. According to the present invention, an advantageous effect is more clearly developed in association with the aspect that the change (selection) of program parts is facilitated.

In a case in which program parts are changed without using the present invention, there will be employed a process in which a source code is changed by a text editor. This is related to a procedure of code editing, re-compilation, and execution of program, and the changes as well as evaluation of the program after the changes are required to be separately controlled.

In this connection, the steps beginning at step 2006 in the flowchart shown in FIG. 20 are a process for candidates of program parts, which hence will be described later.

[8. Recording of layout]

The recording of the new layout will now be described by referring to FIGS. 2, 6, 7, 9, 13, and 16 and FIGS. 21 to 23.

Figure 21:
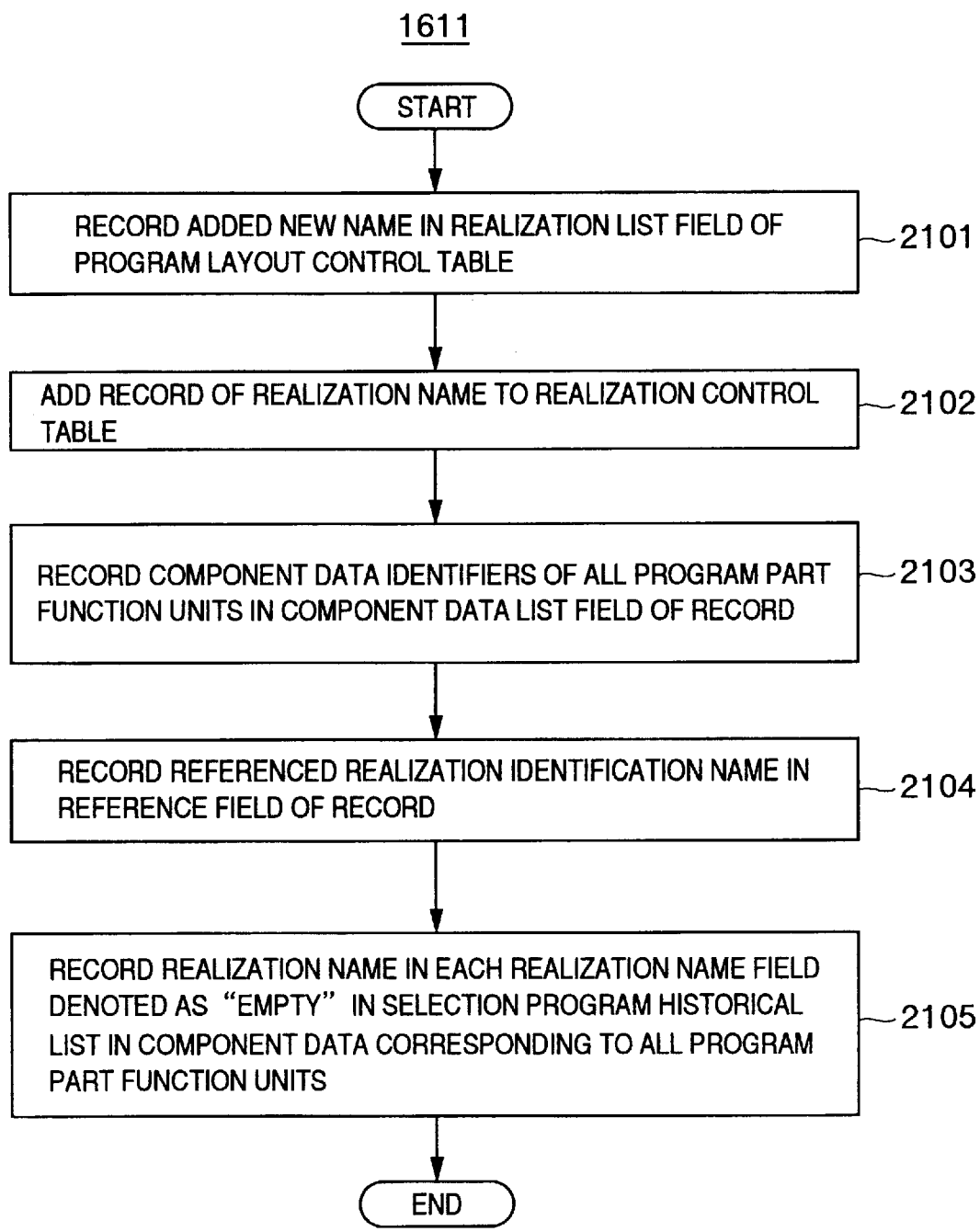
FIG. 21 is a detailed flowchart of a step of layout recording process 1611 in the step of application program execution control process 208 for use in the embodiment of a method of supporting production of an application program layout in accordance with the present invention.

FIG. 21 is a detailed flowchart of step of layout recording process 1611 in the step of execution control process of application program 208 employed in the embodiment of the method of supporting production of application program layout in accordance with the present invention. FIG. 22 is a configuration diagram of the program layout control table 150 utilized in the embodiment of the method of supporting production of application program layout. FIG. 23 is a structure diagram of the realization control table 151 adopted in the embodiment of the method of supporting production of application program layout.

When a layout to be recorded is obtained as a result of evaluation of program parts, there can be established a new layout (substitute layout 1) as a substituting layout of the initial layout. This can be set by clicking by the mouse 106 the record indication button 1340 of the layout setting screen 110 shown in FIG. 13.

When the recording indication is operated, the layout setting program 123 (FIG. 1) receives an input from the user in step 202 of the flowchart of FIG. 2. In step 207, the input is determined to be an indication for the execution control of an application program and then control is transferred to step 208. In this step, the process of execution control of the application program is initiated.

Additionally, in step 1610 of FIG. 16, the input of recording indication is assumed to activate the process of recording the layout in step 1611. Details of the layout recording process will be described by referring to FIG. 21.

In step 2101 of FIG. 21, the realization name which is the new name added to the system is recorded in the realization name list field of program layout control table 150 (FIG. 6). In other words, the realization name, i.e., new name "A2" is registered to the field (Implementations field) corresponding to identifier "1" recorded in the realization name list entry 603 of the body of program layout control table 150 shown in FIG. 6.

The result is, for example, as shown in FIG. 22. Namely, the realization name, i.e., new name "A2" is recorded in the body of program layout control table 150 shown in FIG. 22. Incidentally, in the state of FIG. 22, realization names other than "A1" and "A2" are recorded. However, this is an example in which other realization name are also recorded therein.

Subsequently, in step 2102, a record having the new realization name is added to the realization control table 151 (FIG. 7). That is, in the state of FIG. 7, only the records of realization names "A1" and "A100" are recorded. Added to the table is a record having identifier name "A2".

This results in as shown in FIG. 23. Namely, an identifier "A2" is added to the field of identifier entry 701 in the realization control table 151 shown in FIG. 23.

Additionally, in step 2103, a component data identifier of the function unit of each program part is registered to the component data list field of the record. That is, as can be seen from FIG. 23, the component data identifiers "1, 2, 3, 4, 5, 6" of all program parts are registered to the field (AIDs field) corresponding to identifier "A2" recorded in the field of component data list entry 702.

Subsequently, in step 2104, the realization identifier name referred to is recorded in the reference field of the record. Namely, a shown in FIG. 23, the realization identifier name "A1" referred to is registered to the field (Prev field) corresponding to identifier "A2" recorded in the field of reference entry 703.

Furthermore, in step 2105, the realization name is recorded in any realization name field designated as "Empty" in the selection program history of the component data corresponding to the function unit of each program part. In other words, in step 2003, the item specified in relation to the execution program part is added to the selection program historical list of component data 130 (FIG. 9) and realization name "A2" is recorded in the unrecorded field denoted as "Empty".

In addition, "A2" is recorded in the selection program history (for example, Stock Mgr) for which the realization name is undetermined as a result of the operation above. The historical records are used in a reference operation ([13. Reference to preceding realization]), which will be described later. That is, after the realizations are sequentially altered, it is possible to refer to realization identifier "A2", thereby changing the realization identifier.

Incidentally, in the state shown in FIG. 23, records having realization names other than realization names "A1", "A100", and "A2" are also recorded. It is an example in which records having other realization names are also recorded.

[9. Setting of a plurality of candidate program parts]

The setting of a plurality of candidate program parts will be next described by referring to FIGS. 2, 9, 11, 17, 18, 19, 20, and 24.

Figure 24:
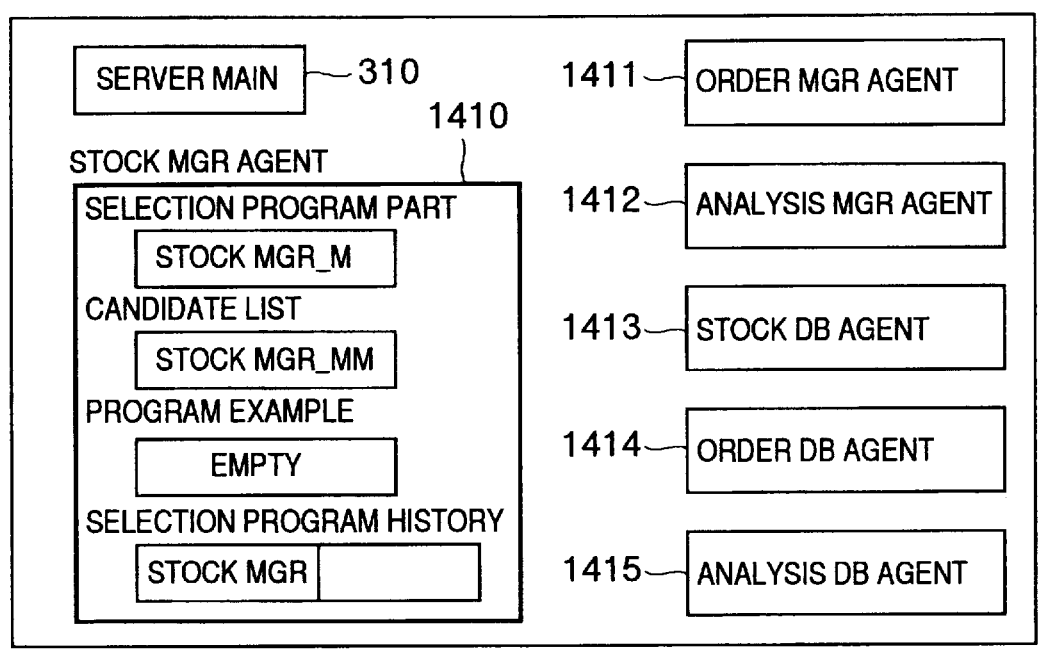
FIG. 24 is a layout diagram of a sales manager server program as an initial application program generated in the embodiment of a method of supporting production of an application program layout in accordance with the present invention.

FIG. 24 is a constitution diagram of the sales manager server program as the initial application program created in the embodiment of the method of supporting production of application program layout in accordance with the present invention.

In the preceding description of [7. Change of program parts], program parts are altered according to discussion of substitute layout 1 to achieve evaluation of program execution. According to the present invention, it is also possible to evaluate a plurality of parts at the same time. For this purpose, program parts having similar functions are arranged in the component data such that the message delivery program distribute messages for program parts executable in association therewith.

For the addition of a program part, the program part function (for example, with specification of Stock Mgr__M) of component sub-screen 1316 is selected in the layout setting screen 110 shown in FIG. 19 and then Add button 1311 by the mouth 106 to specify a candidate part name in the dialog screen displayed.

When the operation is conducted to add the program part, an input is received in step 202 of the flowchart shown in FIG. 2. Next, the input is decided to be specification for layout of program part in step 205 and then control is transferred to step 206. In this step, the process of setting component data is activated.

FIG. 20 shows in a flowchart details of the process to set component data.

In step 2001 of FIG. 20, component data is acquired for a program part as the indication object and then a process is carried out for the attained component data.

In step 2006, the input operation of Add button 1311 is regarded as indication of addition of a program part candidate and step 2007 is therefore executed.

In step 2007, the designated candidate part is registered to the first field 930 of candidate list 911 of component data 130 shown in FIG. 9. Additionally, the program part candidate set to the candidate list 911 is displayed in the candidate list of Candidates sub-screen 1303 of layout setting screen 110 shown in FIG. 19. In the situation of FIG. 19, Stock Mgr__MM is displayed as a candidate part in Candidates sub-screen 1303.

As a result of the change and addition of program parts through the operation above, the internal structure of Stock Mgr Agent 1410 is, for example, as shown in FIG. 24 in which Stock Mgr__M is stored in the selection program part entry, Stock Mgr__MM is registered to the candidate list entry, Stock Mgr is loaded in the selection program historical entry, and "Empty" is set to the program example entry.

Repetitiously accomplishing the operation, candidate parts are sequentially added to fields 931, 932, etc. of candidate list 911. Moreover, the results of addition are presented in Candidates sub-screen 1303.

The sequence of candidate parts in the candidate list indicates the order of execution priority levels in the list. The priority level can be altered by clicking the upward or downward arrow button 1304 or 1305 of FIG. 19 by the mouse 106.

In short, when the upward or downward arrow button 1304 or 1305 is operated, the input is assumed to be indication for upward (or downward) moving of the pertinent program part in step 2010 of FIG. 20 and then step 2011 is executed.

In step 2011, the denoted program part is moved upward (or downward) in the fields of candidate list 911. The results of moving operation are displayed in Candidates sub-screen 1303.

Furthermore, to remove a program part candidate presented in Candidates sub-screen 1303, a program part to be deleted is specified in Candidates sub-screen 1303 and then Remove button 1312 is activated.

When Remove button 1312 is depressed, the input is regarded as deletion of the program part candidate in step 2008 of FIG. 20 and then control is transferred to step 2009.

In step 2009, the specified program part is removed from the field of candidate list 911. When the field is at an upper-level, program parts at the lower level are moved upward.

Description will now be given of a case in which the setting of candidate list displayed in the layout setting screen 110 of FIG. 19 is altered due to execution of addition of candidates and change of priority of candidates. When an execution of program is indicated in this state, the message delivery program in the component data achieves the following process.

Any message which can be processed by Stock Mgr_M (execution program part) displayed in the component subscreen 1302 and specified for execution is delivered to the component data 130 (FIG. 9) of Stock Mgr_M in steps 1707 and 1708 and then the results thereof and the like are stored in the log table 914.

In other cases, step 1707 results in "No" and hence step 1820 is executed.

In step 1820, a check is made to decide whether or not any unprocessed part exists in the candidate program parts list. Namely, the fields 930 to 932 of candidate list 911 (FIG. 9) are checked in the priority order. In this case, since Stock Mgr_MM is registered as an unprocessed program part candidate, control is passed to step 1821.

In step 1821, the unprocessed part at the highest priority level is selected and is set to the processed state in the candidate parts list. Namely, program part Stock Mgr MM is selected.

Additionally, in step 1822, it is determined whether or not the message matches the interface of the selected candidate part. That is, reference is made to the message control table 161 (FIG. 11) to decide whether or not the message is executable. If the message matches the interface, control is transferred to step 1823.

In step 1823, the message is delivered to the selection candidate part, the results thereof are outputted to an external device, and the name of selection candidate part and results are recorded in the log table. In other words, the message is sent to the selected program candidate, i.e., Stock Mgr_MM and then the results are outputted to a port. Moreover, the selection candidate part name and results are written in the log table 914 (FIG. 9).

Incidentally, in a case in which the message mismatches the interface of the chosen candidate part in step 1822 of FIG. 18, control is returned to step 1820 to accomplish a similar process for all unprocessed parts.

When a program part matching the interface is missing in the candidate list in step 1820, control is passed to step 1824.

In step 1824, none of the message interfaces of candidate part is matching, "no delivery part" is recorded. Resultantly, "Error" is displayed in the message log 1325 of layout setting screen 110.

In this connection, Message Log sub-screen 1325 of layout setting screen 110 shown in FIG. 19 displays a state related also to candidate parts as above, namely, results of message delivery associated therewith.

Five message log items shown in Message Log screen 1325 of FIG. 19 indicates the message delivery state described above. According to the first line, program part Stock Mgr_M receives message "Locked" from program part Stock DB and the execution of message delivery has been normally conducted (OK).

The second line indicates that program part Stock Mgr_M receives message "Released" from program part Stock DB and the message delivery has been normally executed (OK).

In accordance with the third line, program part Stock Mgr_M receives message "ADD" from program part Stock Clt and the execution of message delivery has been normally carried out (OK).

The fourth line indicates the following operation. Namely, program part Stock Mgr_M attempts to receive message "Retrieve" from program part Stock Clt. Since message "Retrieve" mismatches the interface of program part Stock Mgr_M, program part Stock Mgr_MM is selected from the candidate list. Program part Stock Mgr_MM receives message "Retrieve" from program part Stock Clt and the execution of message delivery has been normally carried out (OK).

In the fifth line, program part Stock Mgr MM attempts to receive message "Refer" from program part Stock Clt, but the interface mismatches; moreover, in the program part candidates, there is missing any program part matching the interface, which is indicated by "Error".

As a result of the process above, the state of message delivery during the execution can be monitored particularly in Response field 1324 of the message log sub-screen 1325 shown in FIG. 19.

As can be understood from FIG. 19, Stock Mgr_M can process three upper messages, but cannot process two lower messages. Additionally, program part candidate Stock Mgr_MM can execute the fourth process.

According to the results thus obtained, evaluation of the program can be conducted as follows. Referring a portion of Stock Mgr_MM, the program of Stock Mgr_M can be modified to have a satisfactory program layout.

In addition, it can be expected that the evaluation is concurrently accomplished for a plurality of candidates to thereby increase the evaluation speed when compared with the case in which the evaluation is carried out in a candidate-by-candidate manner.

[10. Setting of joker parts]

The setting of joker parts will now be described by referring to FIGS., 2, 9, 13, 17, 20, and 25.

Figure 25:
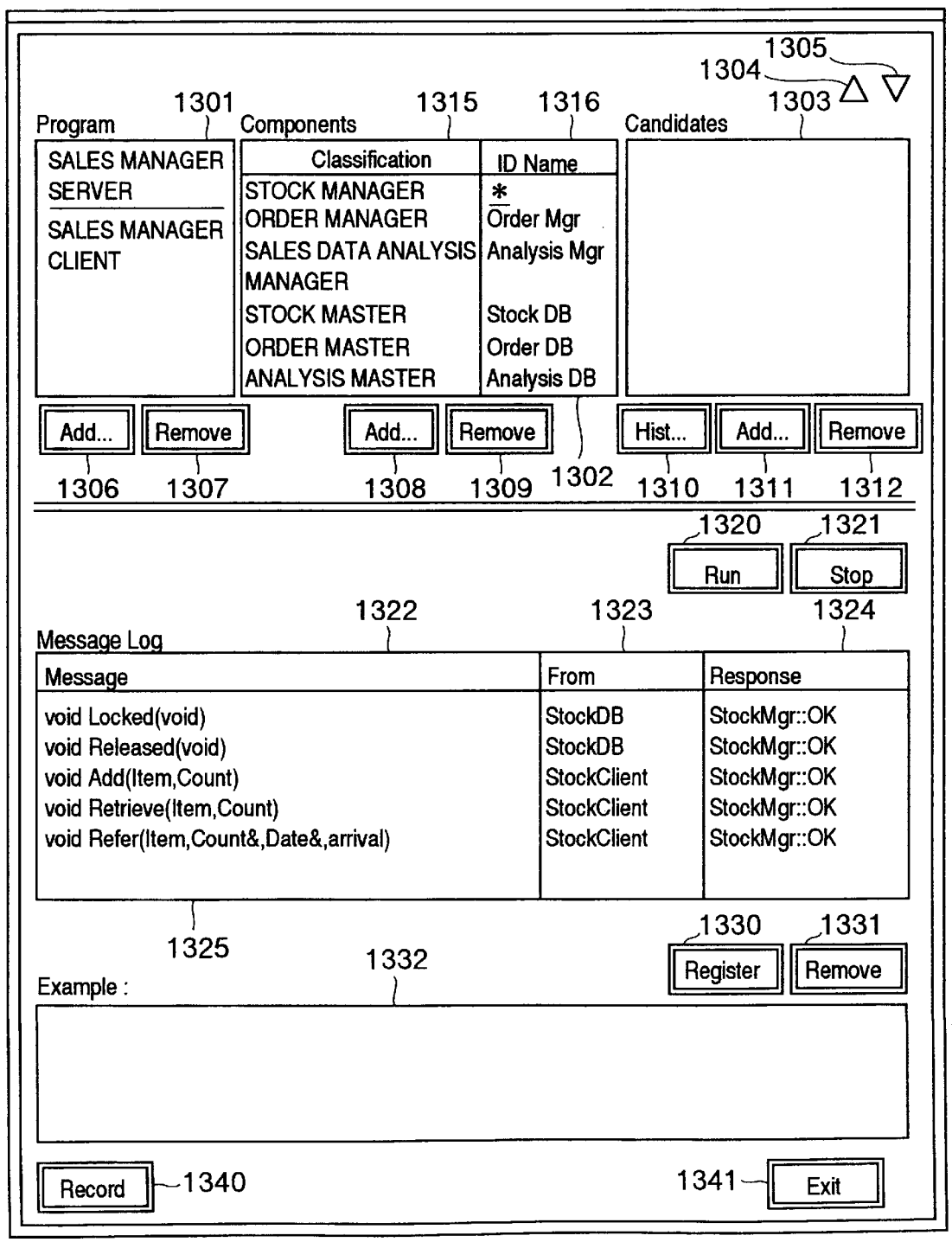
FIG. 25 is a layout diagram of a detailed screen layout of the layout setting screen 110 displayed in the embodiment of a method of supporting production of an application program layout in accordance with the present invention.

FIG. 25 is a detailed configuration diagram of screen layout of the layout setting screen 110 displayed in the embodiment of the method of supporting production of application program layout according to the present invention.

First, description will be given of joker parts.

There may possibly occur a case in which items to be set cannot be easily determined. Such an item can be detected by searching through the program parts control table and/or by referencing the message control table. This however is equivalent to an enquiry to databases. A joker part is provided to obtain a program part matching the interface through execution without using the enquiry procedure.

When a joker part is set, a retrieval step is accomplished to obtain a program part element from a candidate list. At execution thereof, a message is delivered to a program which can responds to the delivered message (i.e., the format is matching therebetween).

Thanks to the joker part, when there are presented several suitable candidates of program part, the operator generating the layout can check the contents of the searched program parts to narrow the range of applicable program parts according to call interfaces and the like.

A joker part is designated by name "*". This can be specified for an execution program.

To specify a joker part in the configuration of the embodiment, a part name is selected to be then changed via the keyboard. In other words, in the state of layout setting screen 110 shown in FIG. 13, "Stock Mgr" of ID Name 1316 of Components sub-screen 1302 is clicked by the mouse 106 to select program part Stock Mgr ("Stock Mgr" is underscored as shown in FIG. 13). Thereafter, the name is changed to "*" via the keyboard 105.

As a result of the operation to specify the joker part, the display contents of layout setting screen 110 are varies as shown in FIG. 25. In this connection, the contents of display in Message Log sub-screen 1325 indicate the results of process, which will be described later. The contents of display will be described later.

When the operation is achieved to specify the joker part, the layout setting program 123 (FIG. 1) receives an input from the user in step 202 of the flowchart shown in FIG. 2. Moreover, in step 205, the input is regarded as specification for layout of program part and control is passed to step 206. In this step, there is initiated a process of setting component data.

FIG. 20 shows in a flowchart details of the process of setting component data.

In step 2001 of FIG. 20, there is attained component data corresponding to a program part as the indication object. A process is achieved for the obtained component data.

In step 2002, the input operation of asterisk "*" is decided to be specification of joker part and control is transferred to step 2005.

In step 2005, the joker specification is notified to the message delivery program 900 (FIG. 9) of the associated component data 130.

In step 1704 of the message delivery program 900 of FIG. 17, the joker specification is recognized and then control is passed to step 1705.

In step 1705, using the message as a condition, a search is made through the message control table 161 in the group of program parts control tables to select a program part with an interface matching the message.

Subsequently, in step 1706, the program part matching the interface is automatically loaded in the main storage 102, the message is delivered thereto, and results of message delivery are outputted via a port. Additionally, the part name and results are recorded in the log table 914 (FIG. 9).

Thanks to the operation above, a program part applicable in conjunction with the context at execution can be retrieved without issuing an enquiry to the database. The result of retrieval is appropriately applicable depending on cases. In such a case, the retrieval and incorporation thereof can be achieved at a time.

FIG. 25 shows an example of execution of joker part. In this case, program part Stock Mgr Agent is set as a joker part. When an execution is indicated in this state, results of message delivery are displayed in the message log sub-screen 1325. Namely, five messages are associated with program part Stock Mgr and the delivery thereof is possible.

Stock Mgr is a program part designated as execution program in the initial layout. Consequently, the retrieval is quite a simple example of retrieval. However, it is to be appreciated that the operation is achieved also with other examples.

The database retrieval is related to a procedure of conducting an investigation for decision of a message process required. For the investigation, it is required to precisely check the overall system. Moreover, it can also be considered messages are dynamically altered (according to system requests). In consideration of these situations, the retrieval of context at execution is not limited to simplification of the procedure, but is quite effective as means to temporarily guarantee the system operation.

In accordance with the configuration of the embodiment, when a joker part is specified, a search is made through the program parts elements of the candidate list to present several suitable candidates of program part. Consequently, the operator generating the layout can examine the contents of retrieved program parts to reduce the number of applicable program parts depending on call interfaces and the like.

[11. Setting of program example]

The setting of program example will next be described by referring to FIGS. 9, 16, 17, and 26.

Figure 26:
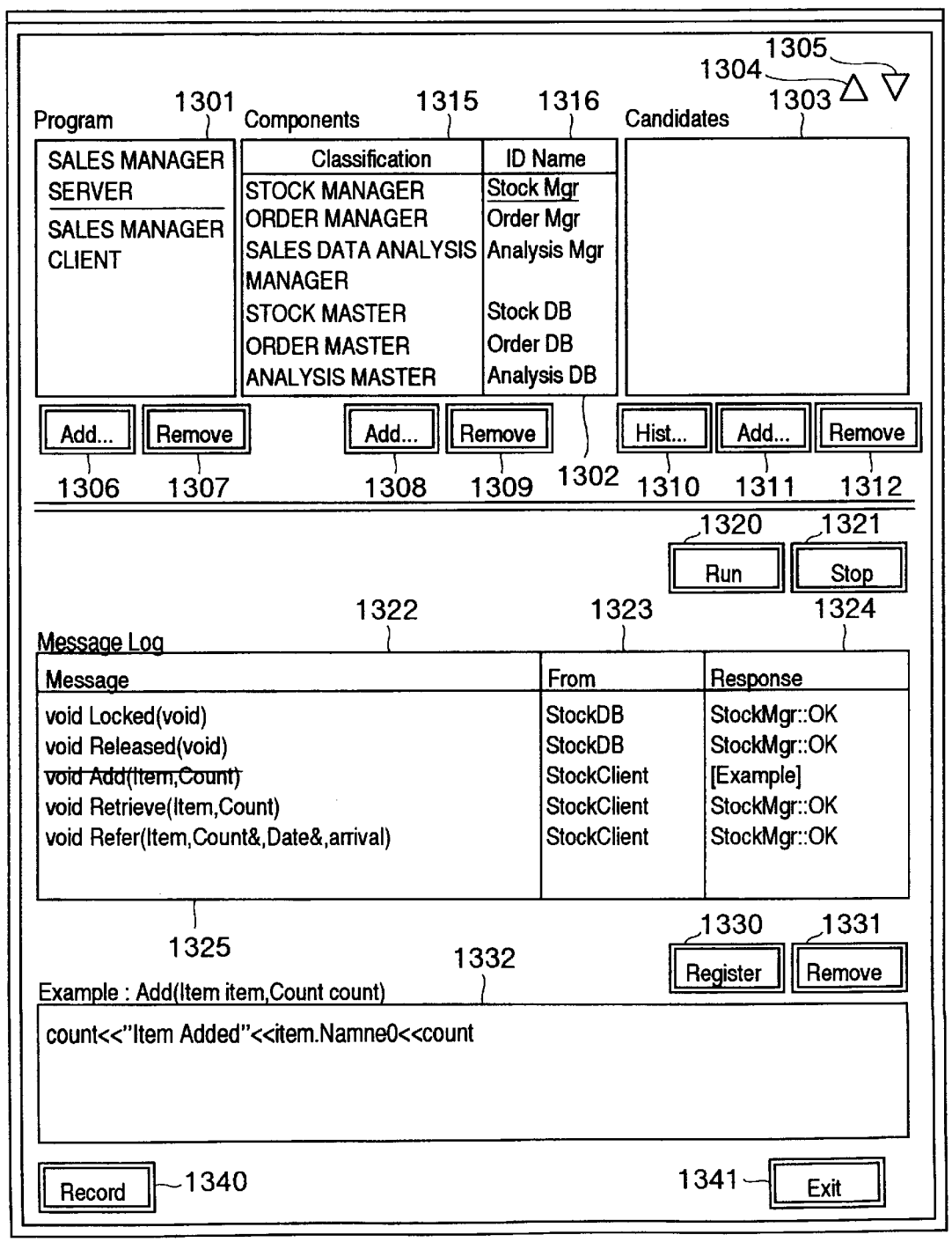
FIG. 26 is a layout diagram of a detailed screen layout of the layout setting screen 110 displayed in the embodiment of a method of supporting production of an application program layout in accordance with the present invention.

FIG. 26 is a detailed configuration diagram of screen layout of layout setting screen 110 displayed in the embodiment of the method of supporting production of application program layout according to the present invention.

First, the program example will be described.

For a program element which has not been generated as a program part and which required a large volume of programming job, the program cannot be continuously executed using the means provided up to this point. In such a case, according to the present invention, there is provided means for component data as an agent to directly respond to a message without any intervention of a program part. This is represented as the program example set in the component data 130 (FIG. 9). In the program example entry 912, there is stored a program example set by the user according to the message.

A process which is expectedly applicable when a call is received from another program can be described in the program example entry 912. When a program example which is registered to the entry and of which the message format matches the pertinent message, the message delivery program delivers the message to the program example. In other words, when a quasi-execution code of an incomplete portion of the program part is described as a program example, the operation of the overall application can be confirmed and evaluated.

FIG. 26 shows an example in which a program example is set to the program example (Example) sub-screen 1332. In this example, a program example is set for Add message required for the part function of stock manager. The program is inputted to Example sub-screen 1332 via the keyboard 105 and is registered by clicking Register button 1330 by the mouse 106.

When Register button 1330 is clicked, the decision results in "Yes" in step 207 of the layout setting program shown in FIG. 2 and then control is passed to step 208 to start the process of controlling application program execution. FIG. 16 shows details of step 208.

In step 1601 of FIG. 16, the input is assumed as indication for registration of program example. In step 1602, the designated message is registered and then there is started a process to achieve the registered program. In this situation, for the indicated message "Add", the execution of the program example shown in Example sub-screen 1332 of FIG. 26 is reported to the agent.

When Add message is inputted during execution of the program, the message delivery program 900 assumes in step 1702 of FIG. 17 that a program example is specified and hence pass control to step 1703.

In step 1703, the program example is executed and results thereof are outputted via a port. Moreover, the execution of program example and results thereof are recorded in the log table 914 of component data 130 (FIG. 9).

The contents of log table 914 are displayed in Message Log screen 1325 of FIG. 26. When the program example is executed, [Example] is displayed. Namely, as indicated in the third line of message log, program example [Example] receives Add message from program part Stock Clt and then executes the program example.

Next, description will be given an operation to remove a program example.

When Remove button 1312 (FIG. 13) is clicked, the layout setting program 123 (FIG. 1) receives an input from the user in step 202 of the flowchart of FIG. 2. Additionally, in step 207, the input is decided to be indication for execution control of application program and then control is passed to step 208.

In step 208, a process is initiated to control execution of an application program.

In step 1603 of FIG. 16 showing the process for execution control of application program, Remove of a program example is recognized to execute the process to remove the program example from the selected program.

In step 1604, the program example is removed in association with the indicated message.

As a result of the operation above, the removing process included in the execution control process is executed.

The program example setting is efficiently applied to, in addition to the case of a program element including a large number of steps, a case in which it is desired to prevent any side effect of program parts (registration to databases) and a case in which the system operation is to be confirmed only according to message integrity in an initial stage.

According to the configuration of the embodiment, a process expected to be used in response to a call from another program, namely, a quasi-code of an incomplete portion of a program part is assumed as a program example to be described in the program example entry 912. When message format matches, the message delivery program delivers the message to the program example. Consequently, the operation of the entire application can be confirmed and evaluated.

As described above, using means of [7. Change of program parts], [9. Setting of a plurality of candidates], [10. Joker parts], and [11. Program examples], substitute layouts can be consecutively established and realization thereof can be repeatedly accomplished. That is, it is possible to achieve the operation in which "the respective program parts are actually incorporated in the program for evaluation" Substitute layouts 1 to 4 described at the beginning in conjunction with the configuration of the embodiment can be successively realized in this sequence.

[12. Change of layout of part function]

Referring next to FIGS. 7, 8, 13, and 27, description will be given of a case in which the layout of function unit of program part is changed.

Figure 27:
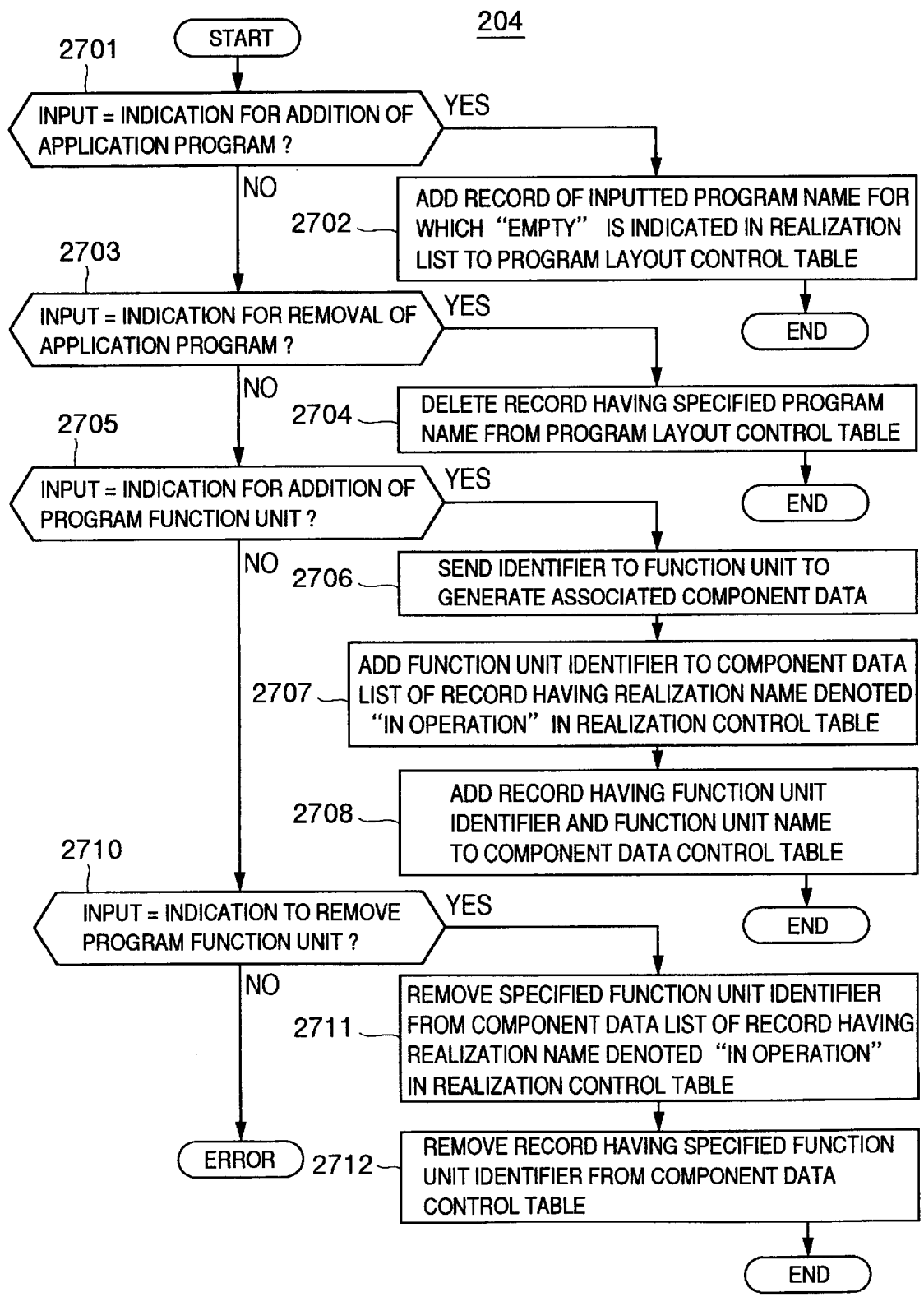
FIG. 27 is a detailed flowchart of a step of function layout setting process 204 for use in the embodiment of a method of supporting production of an application program layout in accordance with the present invention.

FIG. 27 is a detailed flowchart of the step of process of setting functional layout 204 adopted in the embodiment of the method of supporting production of application program layout.

Addition and removal of the part function unit are frequently accomplished during the system development. In relation to the configuration of the embodiment, there has been already described an example in which a database playing a role of local cache of a server database is installed on the client side. This is regarded as the change of function unit.

The addition of function unit is carried out according to indication of addition of a part in the layout setting screen. That is, when Add button 1308 of layout setting screen 110 (FIG. 13) is clicked by the mouse 106, the process of adding part function is initiated.

When Add button 1308 is clicked, the layout setting program 123 (FIG. 1) receives an input from the user in step 202 of the flowchart shown in FIG. 2. Additionally, in step 203, the input is recognized as specification of function layout of application program and then control is transferred to step 204.

In step 204, there is started a process of setting function layout. FIG. 27 shows in a flowchart details of the process above.

In step 2705 of FIG. 27, the addition (Add) of program function unit is assumed and a process is executed to add a program function unit to the selected program.

In step 2706, an identifier is assigned to the function unit and component data is generated in association therewith. The name of function unit is inputted to the dialog screen via the keyboard. As a result, the layout setting process creates component data corresponding to the new function unit.

Subsequently, in step 2707, the identifier of function unit is added to the field of component data list entry 702 of the record having the realization name in operation in the realization control table 151 (FIG. 7). Furthermore, a record associated with the new component data is also written in the program layout control table.

Thereafter, in step 2708, a record including the identifier of function unit and function unit name (component name) is recorded in the component data control table 152 (FIG. 8) in step 2708.

Through the operation above, the process of adding part function is accomplished.

In addition, the removal of program function unit is carried out in a procedure reverse to that of addition described above.

When Remove button 1309 (FIG. 13) is clicked, the layout setting program 123 (FIG. 1) receives an input from the user in step 202 of the flowchart shown in FIG. 2. Moreover, in step 203, the input is regarded as specification for function layout of application program and then control is transferred to step 204.

In step 204, a process is started to set the function layout.

In step 2710 of FIG. 27 showing the process of setting function layout, the removal (Remove) of program function unit is assumed and hence there is executed a process to remove a program part function from the selected program.

In step 2711, the identifier of function unit is removed from the component data list entry 702 related to a record having a realization name in operation in the realization control table 151 (FIG. 7).

Subsequently, in step 2712, a record having the identifier of function unit is removed from the component data control table 152 (FIG. 8) in step 2712.

As above, the process of removing part function is conducted. However, since the component data may be referred to later, there is provided security measures, for example, to prevent the component data from being deleted.

Thanks to the addition of program function unit described above, it is possible to produce substitute layouts 0 to 5. However, the immediately preceding realization is not referred to, there is required means to refer to preceding realizations, i.e., realized program layouts, which will be subsequently described.

[13. Reference to layouts realized before]

Referring next to FIGS. 2, 9, 19, 20, 23, 28, 29, and 30, description will be given of a case of reference to history in which a new realization is created by referring to realizations generated in the past.

Figure 28:
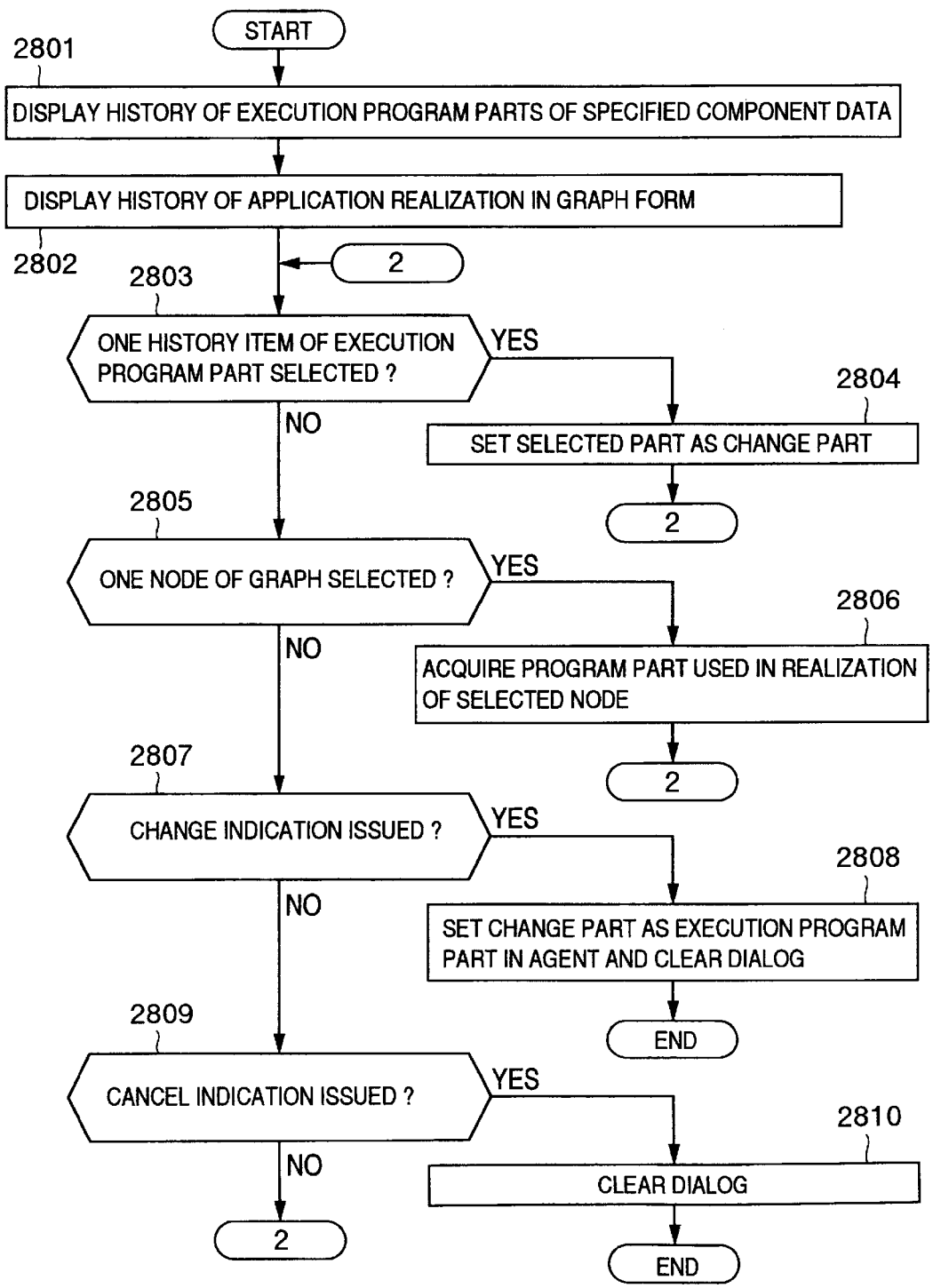
FIG. 28 is a flowchart of a process of referencing program substitution history in the step of component data setting process 206 for use in the embodiment of a method of supporting production of an application program layout in accordance with the present invention.
Figure 29:
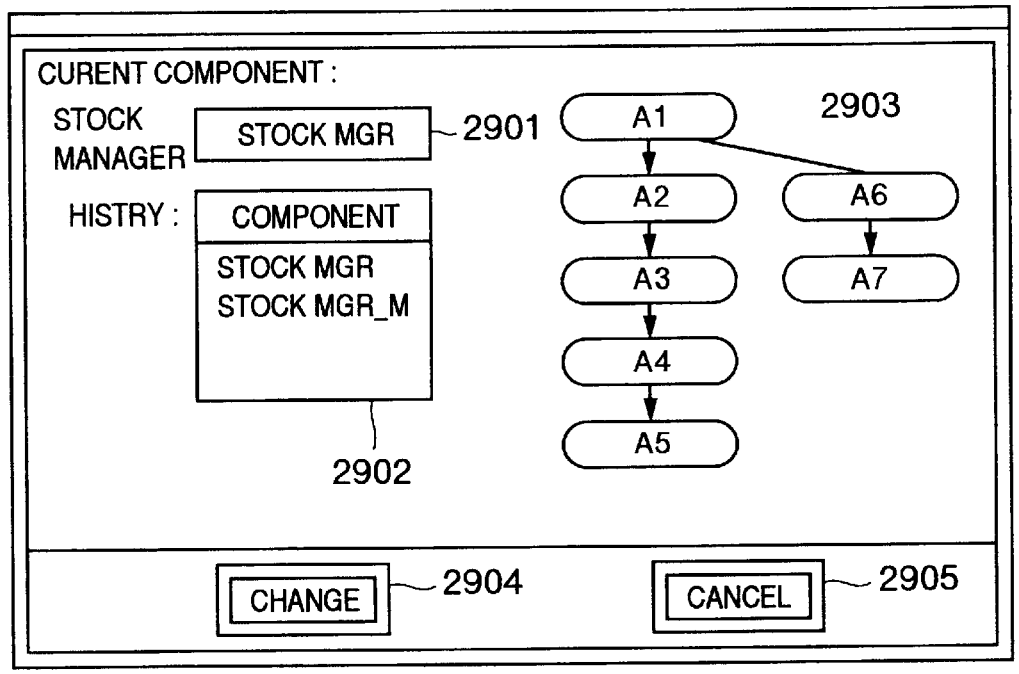
FIG. 29 is a layout diagram of a history screen of the process of referencing program substitution history for use in the embodiment of a method of supporting production of an application program layout in accordance with the present invention.
Figure 30:
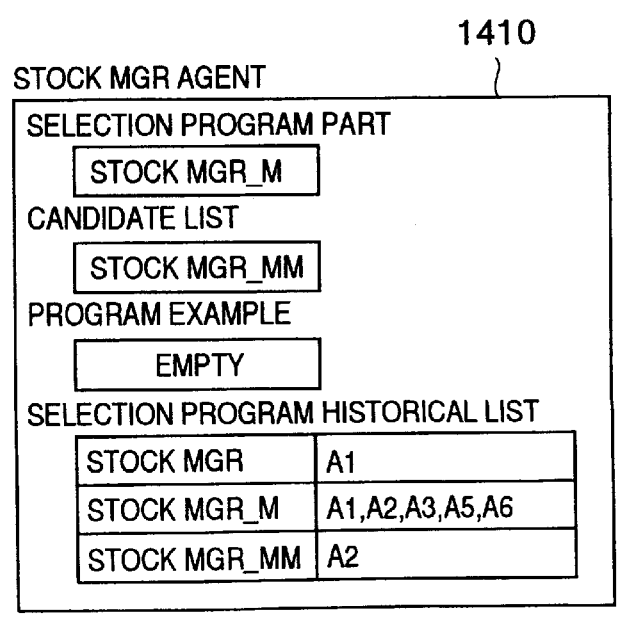
FIG. 30 is a layout diagram of component data in the process of referencing program substitution history for use in the embodiment of a method of supporting production of an application program layout in accordance with the present invention.

FIG. 28 is a flowchart of the process of reference to program substitution history in the step of process of setting component data 206 adopted in the embodiment of the method of supporting production of application program layout according to the present invention. FIG. 29 is a configuration diagram of the history screen of the process reference to program substitution history employed in the embodiment of the method of supporting production of application program layout. FIG. 30 is a layout diagram of component data in the process reference to program substitution history employed in the embodiment of the method of supporting production of application program layout.

In the production of application program layout, it is necessary to control history of changes so that an arbitrary layout of combination can be restored in any situation. For this purpose, there is adopted the selection program historical list. Recorded as elements in this list are combinations of program part records and realization names. In this regard, the realization name is employed to identify a realization example combination. When a realization name is inputted at an arbitrary point of time, a search is made through the historical lists of all component data items to thereby restore any combination.

According to the configuration of the embodiment, the reference to a preceding realization is accomplished by clicking History button 1310 in layout setting screen 110 of FIG. 19 by the mouse 106.

When the operation of indication for reference to history, the layout setting program 123 (FIG. 1) receives an input from the user in step 202 of the flowchart shown in FIG. 2. Additionally, in step 205, the input is recognized as indication for process of setting component data and then control is passed to step 206. In this step, a process is started to set component data.

Subsequently, in step 2012 of FIG. 20, the input is regarded as indication for reference to history and hence a process of referencing program substitution history is activated in step 2013. Details of the process will be described by referring to FIG. 28.

In step 2801 of FIG. 28, historical information of an execution program part of the indicated component data is displayed in the dialog screen.

The historical screen displayed in the dialog screen will be described by referring to FIG. 29. Displayed in the historical screen is history of an execution program related to the specified program part function unit. Assume in this case that "stock manager" is selected in Classification screen 1315 displaying classification of program parts of FIG. 19 and then History button 1310 is clicked.

In the configuration of historical screen, the component data sub-screen 2901 is displayed on the right of "stock manager" as a program part function unit. Moreover, displayed therebelow is a historical sub-screen 2902. Display operation of the component data sub-screen 2901 and historical sub-screen 2902 are carried out by referring to the selection program historical list 913 in the component data 130 (FIG. 9).

FIG. 30 shows the internal structure of Stock Mgr Agent 1410 as component data. In Stock Mgr Agent 1410, Sock Mgr__M is stored in the selection program parts entry, Stock Mgr__MM is registered to the candidate list entry, and realization names corresponding to Stock Mgr, Stock Mgr__M, and Stock Mgr__MM are stored in the selection program historical list entry. The program example entry is in the empty state.

In consequence, the referenced component data name "Stock Mgr" is displayed in the component data sub-screen 2901 and the program name which is the preceding realization recorded in the field of selection program historical list of Stock Mgr Agent 1410 is presented in the historical sub-screen 2902. The contents thereof will be described later.

Subsequently, in step 2802, the history of application realization will be displayed as a graph (with orientation) on the right side of the historical screen. In the graph configuration, an oriented ark indicating a direction represents transition from a node to another node. In the example of graph shown in FIG. 29, the substitution history of FIG. 4 are represented. This graph can be drawn by sequentially accessing Prev fields of reference entry 703 of realization control table 15 (FIG. 23). In this connection, FIG. 23 shows an example the realization control table 151 at discussion of substitution layout 6. "Initial layout" and "substitute layout 1" of FIG. 4 correspond to realization names "A1" and "A2". This similarly applies to substitute layouts 2 to 5, and finally "substitute layout 6" is associated with realization name "A6".

Incidentally, for example, as shown in FIG. 23, realization name "A1" is in Prev field of realization name "A2". Therefore, an arc can be drawn from the node of "A1" to the node of "A2". In a similar fashion, arcs can be drawn between the nodes to thereby display a tree structure ranging from realization name "A2" to realization name "A7".

Next, in step 2805, a check is made to decide whether or not one of the nodes of graph has been selected. The node selection is accomplished by clicking the node by the mouse 106. In response to the selection of node, step 2806 is executed.

In step 2806, the selection program history of the selection node at realization is displayed in the historical sub-screen 2902. For example, in the layout of FIG. 29, when node "A1" is clicked by the mouse 106, only the execution program part set according to "A1" is presented in the sub-screen 2902. This is realized by a process of displaying in the sub-screen only the execution program part for which "A1" is recorded in relation to the preceding realization name written in the filed of the selection program historical list. On this occasion, Stock Mgr and Stock Mgr__M are displayed.

Returning now to step 2803, when the program part is selected in the historical sub-screen 2902, step 2804 is executed.

In step 2804, the chosen part is set as a candidate for change.

Subsequently, description will be given of the change of part.

In Step 2807, whether or not the change of part has been indicated is determined. The indication for change of part is effected by clicking Change button 2904 in the dialog screen of FIG. 27 by the mouse 106.

Subsequently, in step 2808, the change is conducted for the execution program in the agent and then the dialog is cleared.

Furthermore, when Cancel button 2905 is clicked by the mouse 106, the input is assumed to be cancel indication in step 2909 and then the change is cancelled and the dialog is cleared in step 2910.

Using the change function, it is possible to establish a linkage from substitute layout 1 to substitute layout 5 shown in FIG. 4, and the realization of substitute layout 4 can be referred to from substitute layout 6.

According to the configuration of the embodiment described above, a program can be executed while parts thereof are being replaced (selected) so that the program can be evaluated at the same time.

In accordance with the configuration of the embodiment, in a case in which the selection program historical list is adopted, when a realization name of the selection program historical list is inputted at an arbitrary point of time, it is possibly to restore any combination by making a search through the historical list of all component data items. Therefore, in the production of application program layout, the history of changes are controlled such that any layout can be restored using an arbitrary combination.

[14. Change of application program]

Referring now to FIGS. 2, 6, 13, and 27, description will be given of a case in which an application program is altered.

Addition of an application program is achieved by indicating a program addition in the layout setting screen. In short, when Add button 1306 is clicked in the layout setting screen 110 (FIG. 13) by the mouse 106, a process is initiated for the addition of an application program.

When Add button 1306 is clicked, the layout setting program 123 (FIG. 1) receives a user input in step 202 of the flowchart shown in FIG. 2. Additionally, in step 203, the input is assumed as specification for function layout of an application and then control is transferred to step 204.

In step 204, a process is initiated to set the function layout. FIG. 27 shows in a flowchart details of the process of setting the function layout.

In step 2701 of FIG. 27, addition (Add) of an application program is assumed and hence there is executed a process for the addition of the application program.

In step 2702, a record which has a program name inputted is added to the program layout control table 150 (FIG. 6) with the realization list entry set to the empty state.

Through the operation above, there is accomplished the process of adding application program.

Moreover, for removal of an application program, when Remove button 1307 (FIG. 13) is clicked, the layout setting program 123 (FIG. 1) receives an input from the user in step 202 of the flowchart of FIG. 2. Thereafter, in step 203, the input is recognized as specification for function layout of an application program and hence control is passed to step 204.

In step 204, a process is commenced to set a function layout.

In step 2703 of FIG. 27 showing the process of setting function layout, removal (Remove) of an application program is assumed and there is accordingly executed the process of removing the application program.

In step 2704, a record having a program name inputted is removed from the program layout control table 150 (FIG. 6).

By the operation above, the process of removing application program is accomplished.

In accordance with the configuration of the embodiment described above, an application can configured by combining a large number of program parts with each other while actually achieving selection (evaluation) of program parts of the layout in a successive manner.

Consequently, when compared with the method implemented using the database support, the present method provides a chance of discussion of functions, performance, design in more detail by actual operating program parts.

Additionally, since the embodiment adopted a method in which program parts is included in component data, independence of the frame of evaluation is increased when compared with the method in which the program is directly modified and/or in which program parts are replaced during execution of an interactive process.

In another embodiment, either one or both of a storage 128 and a communication interface 129 may be connected to the system bus 107 as shown in FIG. 1.

The application programs and the tables shown in the main storage 102 can be sent via the communication interface 129 and stored in the storage. It is also possible to mount the storage having program codes and table data into the system as shown in FIG. 1, sending them to the storage 102.

The independence above appears as degree of freedom in which a plurality of parts can be set as candidates, joker parts are available, and program examples can be specified. Each of the functions may be accomplished in the interactive process of the prior art. However, according to an aspect of the present invention, there is obtained an advantage that the respective functions can be incorporated in the program through a simple operation while preventing interferences therebetween.

Additionally, the selection of parts can be conducted after confirming messages transmitted from the application to be produced. Information items of identifiers and usage situations of messages can be employed as auxiliary information for the selection of parts. This is quite efficient particularly in a case of a joker part in which there is produced a program layout for a provisional operation. There can also be achieved a job in which the system specification is confirmed using only joker parts and program examples.

Furthermore, it is also possible to trace the selected series in a reverse direction as well as to refer to items of another element of series while using the series of realization and contents evaluated at realization. This is effective when the contents discussed for a realization are to be investigated again.

In general, as an expected effect of the configuration of the embodiment, the evaluation of layout can be achieved not only through calculations on a desk, but also through operation in the actual environment. This consequently makes it possible to achieve an appropriate development according to requirements.

In the method of supporting production of application program layout according to the present invention, during a process of combining program parts with each other, it is possible to sequentially execute the parts for evaluation thereof.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A method of supporting production of an application program layout by combining with each other a plurality of program parts obtained by subdividing an application program from a viewpoint of function units thereof, said program controlling execution of a computer system, comprising the steps of:

(a) disposing a program parts control table including part records each including an identifier identifying each of the program parts, a function classification for classifying each of the program parts according to a function thereof, a message interface for interfacing messages of the program parts, and an execution object predetermined for an application program;

(b) disposing a program layout control table describing a layout of an application program with a layout record including an identifier of each of the program parts stored in the program parts control table;

(c) disposing component data items each having a one-to-one correspondence with the layout records and including a program part entry storing therein parts records of the program parts control table and a message delivery program delivering an external message call to an execution object corresponding to the program parts of the program part entry;

(d) (A) responsive to an indication input including specifying of a program part by an identifier for the program part realizing each function of the application program;

(A-1) acquiring component data corresponding to the function;

(A-2) acquiring the part record including the identifier from the program parts control table, referring to the part record, and setting the part record to the program part entry of the component data;

(B) responsive to an indication input of execution of the application program;

(B-1) generating an execution object including all component data items corresponding to the layout record of the program layout control table;

(B-2) executing the execution object through exchange of the messages between the component data items; and (B-3) sending the message delivered to each component data item to the message delivery program.

2. A method of supporting production of an application program layout according to claim 1, further including the steps of:

disposing in the component data a candidate list for storing therein a list of program parts;

storing in the candidate list a program part of a program parts control table for exchange with the program part entry; and setting specified one of the program parts stored in the candidate list to the program part entry.

3. A method of supporting production of an application program layout according to claim 2, further including the steps of:

being responsive to an indication input of program parts in step (A), the indication input specifying a joker part;

executing the message delivery program in step (B-3) according to a format of the message;

achieving comparison by the message delivery program, for each of the part records stored in the candidate list of the component data, between a message format attained from the part record and that of the delivered message, thereby delivering the message to an execution object acquired from the part record for which the comparison results in matching.

4. A method of supporting production of an application program layout according to claim 1, wherein a searching sequence of the part records in the candidate list of the component data can be changed in the search thereof when an execution of the application program is indicated.

5. A method of supporting production of an application program layout according to claim 1, further including the steps of:

assigning a realization name as a name for a combination of parts of the application program;

disposing in the layout record of the program layout control table a realization entry for storing therein the realization name;

disposing in the component data a historical list including as an element thereof a combination of the part record and the realization name;

being responsive to an indication of saving of a layout of the application program with specification of the realization name;

recording the realization name in the realization name entry of the layout record in the program layout control table; and recording in the history control list of the component data the part record and the realization name stored in the program part entry.

6. A method of supporting production of an application program layout according to claim 5, further including the steps of:

displaying a plurality of nodes presenting the realization names on a display in a format using arcs establishing connections between the nodes according to relationship of dependence related to the realization.

7. A method of supporting production of an application program layout according to claim 1, further including the steps of:

disposing in the component data a program example entry for storing therein information of a particular call interface and an execution object associated therewith;

referring, by the message delivery program, to the format of an external message call, thereby delivering the message to the execution object when the format matches the interface information of the program example entry.

8. A method of supporting production of an application program layout according to claim 1, further including the steps of:

disposing in the part record of the program parts control table an entry for storing therein a connection results list; and storing program parts in the connection results list of each of the part record when an application program is saved, the program parts included in an identical application program in the program layout control table.

9. A method of supporting production of an application program layout according to claim 1, wherein said layout record includes a program name stored in the program parts control table.

10. An apparatus of supporting production of an application program layout by combining with each other a plurality of program parts obtained by subdividing an application program from a viewpoint of function units thereof, comprising:

(a) a program parts control table including part records each including an identifier identifying each of the program parts, a function classification for classifying each of the program parts according to a function thereof, a message interface for interfacing messages of the program parts, and an execution object predetermined for an application program;

(b) a program layout control table describing a layout of an application program with a layout record including an identifier of each of the program parts stored in the program parts control table;

(c) component data items each having a one-to-one correspondence with the layout records and including a program part entry storing therein parts records of the program parts control table and a message delivery program delivering an external message call to an execution object corresponding to the program parts of the program part entry;

(d) (A) means for, responsive to an indication input including specifying of a program part by an identifier for the program part realizing each function of the application program;

(A-1) acquiring component data corresponding to the function; and (A-2) acquiring the part record including the identifier from the program parts control table, referring to the part record, and setting the part record to the program part entry of the component data; and (B) means for, responsive to an indication input of execution of the application program;

(B-1) generating an execution object including all component data items corresponding to the layout record of the program layout control table;

(B-2) executing the execution object through exchange of the messages between the component data items; and (B-3) sending the message delivered to each component data item to the message delivery program.

11. An apparatus of supporting production of an application program layout according to claim 10, further including:

a candidate list disposed in the component data for storing therein a list of program parts;

wherein a program part of a program parts control table for exchange with the program part entry is stored in the candidate list; and specified one of the program parts stored in the candidate list to the program part entry is set.

12. An apparatus of supporting production of an application program layout according to claim 11, further including:

means for executing, responsive to an indication input of program parts specifying a joker part, the message delivery program according to a format of the message; and means for achieving comparison by the message delivery program, for each of the part records stored in the candidate list of the component data, between a message format attained from the part record and that of the delivered message, thereby delivering the message to an execution object acquired from the part record for which the comparison results in matching.

13. An apparatus of supporting production of an application program layout according to claim 10, wherein a searching sequence of the part records in the candidate list of the component data can be changed in the search thereof when an execution of the application program is indicated.

14. An apparatus of supporting production of an application program layout according to claim 10, further including:

means for assigning a realization name as a name for a combination of parts of the application program;

means for disposing in the layout record of the program layout control table a realization entry for storing therein the realization name;

means for disposing in the component data a historical list including as an element thereof a combination of the part record and the realization name;

means for recording, responsive to an indication of saving of a layout of the application program with specification of the realization name, the realization name in the realization name entry of the layout record in the program layout control table; and means for recording in the history control list of the component data the part record and the realization name stored in the program part entry.

15. An apparatus of supporting production of an application program layout according to claim 14, further including:

a display displaying a plurality of nodes presenting the realization names on a display in a format using arcs establishing connections between the nodes according to relationship of dependence related to the realization.

16. An apparatus of supporting production of an application program layout according to claim 10, further including:

means for disposing in the component data a program example entry for storing therein information of a particular call interface and an execution object associated therewith; and means for referring, by the message delivery program, to the format of an external message call, thereby delivering the message to the execution object when the format matches the interface information of the program example entry.

17. An apparatus of supporting production of an application program layout according to claim 10, further including:

means for disposing in the part record of the program parts control table an entry for storing therein a connection results list; and means storing program parts in the connection results list of each of the part record when an application program is saved, the program parts included in an identical application program in the program layout control table.

18. An apparatus of supporting production of an application program layout according to claim 10, wherein said layout record includes a program name stored in the program parts control table.

19. A computer program product comprising a computer readable code means for supporting production of an application program layout by combining with each other a plurality of program parts obtained by subdividing an application program from a viewpoint of function units thereof, said program controlling execution of a computer system, said code means comprising:

(a) means for disposing a program parts control table including part records each including an identifier identifying each of the program parts, a function classification for classifying each of the program parts according to a function thereof, a message interface for interfacing messages of the program parts, and an execution object predetermined for an application program;

(b) means for disposing a program layout control table describing a layout of an application program with a layout record including an identifier of each of the program parts stored in the program parts control table;

(c) means for disposing component data items each having a one-to-one correspondence with the layout records and including a program part entry storing therein parts records of the program parts control table and a message delivery program delivering an external message call to an execution object corresponding to the program parts of the program part entry;

(d) (A) means for, responsive to an indication input including specifying of a program part by an identifier for the program part realizing each function of the application program, (A-1) acquiring component data corresponding to the function;

(A-2) acquiring the part record including the identifier from the program parts control table, referring to the part record, and setting the part record to the program part entry of the component data; and (B) means for, responsive to an indication input of execution of the application program, (B-1) generating an execution object including all component data items corresponding to the layout record of the program layout control table;

(B-2) executing the execution object through exchange of the messages between the component data items; and (B-3) sending the message delivered to each component data item to the message delivery program.

20. A computer program product according to claim 19, said code means further including:

means for disposing in the component data a candidate list for storing therein a list of program parts;

means for storing in the candidate list a program part of a program parts control table for exchange with the program part entry; and means for setting specified one of the program parts stored in the candidate list to the program part entry.

21. A computer program product according to claim 20, further including:

means for, responsive to an indication input of program parts specifying a joker part;

means for executing the message delivery program according to a format of the message; and means for achieving comparison by the message delivery program, for each of the part records stored in the candidate list of the component data, between a message format attained from the part record and that of the delivered message, thereby delivering the message to an execution object acquired from the part record for which the comparison results in matching.

* * * * *